US012572976B1

(12) United States Patent
Lateef

(10) Patent No.: US 12,572,976 B1
(45) Date of Patent: Mar. 10, 2026

(54) SYSTEM AND METHOD FOR ELECTRONIC COMMUNICATIONS AND CUSTOMER INTERACTIONS WITH RETAIL STORES

(71) Applicant: Mi Italia, Inc., Dover, DE (US)

(72) Inventor: Zahed Lateef, Paradise Valley, AZ (US)

(73) Assignee: Mi Italia, Inc., Dover, DE (US)

( * ) Notice: Subject to any disclaimer, the term of this patent is extended or adjusted under 35 U.S.C. 154(b) by 0 days.

(21) Appl. No.: 18/882,936

(22) Filed: Sep. 12, 2024

(51) Int. Cl.
| | |
|---|---|
| *G06Q 30/00* | (2023.01) |
| *G06Q 10/087* | (2023.01) |
| *G06Q 30/0201* | (2023.01) |
| *G06Q 30/0601* | (2023.01) |

(52) U.S. Cl.
CPC ....... *G06Q 30/0643* (2013.01); *G06Q 10/087* (2013.01); *G06Q 30/0201* (2013.01); *G06Q 30/0631* (2013.01); *G06Q 30/0635* (2013.01)

(58) Field of Classification Search
None
See application file for complete search history.

(56) References Cited

U.S. PATENT DOCUMENTS

| | | | |
|---|---|---|---|
| 9,852,234 B2 | 12/2017 | Gannon | |
| 10,318,916 B2 | 6/2019 | Altieri | |
| 11,100,560 B2 | 8/2021 | Parker | |
| 11,804,023 B1 | 10/2023 | Deuskar | |
| 11,861,673 B2 | 1/2024 | Bleicher | |
| 11,868,415 B1 * | 1/2024 | Daniel | G06F 16/2457 |

| | | | |
|---|---|---|---|
| 2013/0151381 A1 * | 6/2013 | Klein | G06Q 10/087 |
| | | | 705/27.1 |
| 2015/0073912 A1 * | 3/2015 | Brady | G06Q 30/0269 |
| | | | 705/14.66 |
| 2015/0154691 A1 * | 6/2015 | Curry | G06Q 30/0631 |
| | | | 705/27.2 |
| 2016/0042315 A1 * | 2/2016 | Field-Darragh | H04B 5/77 |
| | | | 705/28 |
| 2016/0180447 A1 | 6/2016 | Kamalie | |
| 2018/0182001 A1 * | 6/2018 | Ghoshal | G06Q 30/0282 |
| 2019/0188784 A1 | 6/2019 | Bleicher | |
| 2019/0228448 A1 | 7/2019 | Bleicher | |
| 2022/0215450 A1 | 7/2022 | Gadre | |

(Continued)

OTHER PUBLICATIONS

Xu, X., Processing Flow of Facebook Newsfeed Ads: Exploring Product Characteristics and Promotions in Fluid Social Media Use, Aug. 3, 2020, UConn Library Doctoral Dissertations, 2596, pp. 1-122. (Year: 2020).*

(Continued)

*Primary Examiner* — Kelly S. Campen
*Assistant Examiner* — Brittany E Bargeon
(74) *Attorney, Agent, or Firm* — Fitch, Even, Tabin & Flannery LLP

(57) ABSTRACT

For each potential retail store of interest indicated by a customer in the store selection, an electronic connection is made between a computer application operated by the customer and an electronic accounting system of each retail store. The electronic accounting system is adjusted in real-time by events occurring at the retail store. Contents of the electronic accounting system are visible, accessible, and adjustable by the computer application in real time. Various other actions can occur such as displaying customer avatars and offering suggestions to customers.

16 Claims, 12 Drawing Sheets

(56) References Cited

U.S. PATENT DOCUMENTS

| | | |
|---|---|---|
| 2022/0258049 A1 | 8/2022 | Kanani |
| 2022/0374966 A1* | 11/2022 | Saint-Pierre ......... G06Q 10/087 |
| 2023/0104072 A1 | 4/2023 | Terry |
| 2023/0186407 A1* | 6/2023 | Hosseini ............ G06Q 30/0269 |
| | | 705/14.53 |
| 2023/0377012 A1 | 11/2023 | Bleicher |

OTHER PUBLICATIONS

Screenshot of Best Buy "Your Cart" showing pick up availability for: LG-77" Class C3 Series OLED 4K UHD Smart webOS TV; accessed Feb. 2, 2024.

* cited by examiner

1200

1202

1204

Message from store X
Here is you wearing the shirt
you selected

☐ Select a different shirt

☐ Select a different size

☐ Select a different color          1206

☐ Return to previous screen

☐ Select other options

SYSTEM AND METHOD FOR ELECTRONIC COMMUNICATIONS AND CUSTOMER INTERACTIONS WITH RETAIL STORES

FIELD OF INVENTION

The field of invention relates to electronic communications and interactions between mobile electronic devices and retail stores.

BACKGROUND

Customers often wish to purchase various types of products from retail stores. Often these stores are unique, that is, not part of or connected with large national or international chains. These stores typically have their own inventory systems and operate as stand-alone establishments.

With the number of independent stores being huge and the number of products sold by these stores even larger, it has proven difficult for customers to efficiently interact with these types of retail operations and be offered manageable selections from the stores that take into account the preferences and desires of the customer.

BRIEF DESCRIPTION OF THE DRAWINGS

Various needs are at least partially met through provision of approaches that provide system and methods for electronic communications with retail stores. A full and enabling disclosure of the aspects of the present description, including the best mode thereof, directed to one of ordinary skill in the art, is set forth in the specification, which refers to the appended figures, in which.

Figure 1:
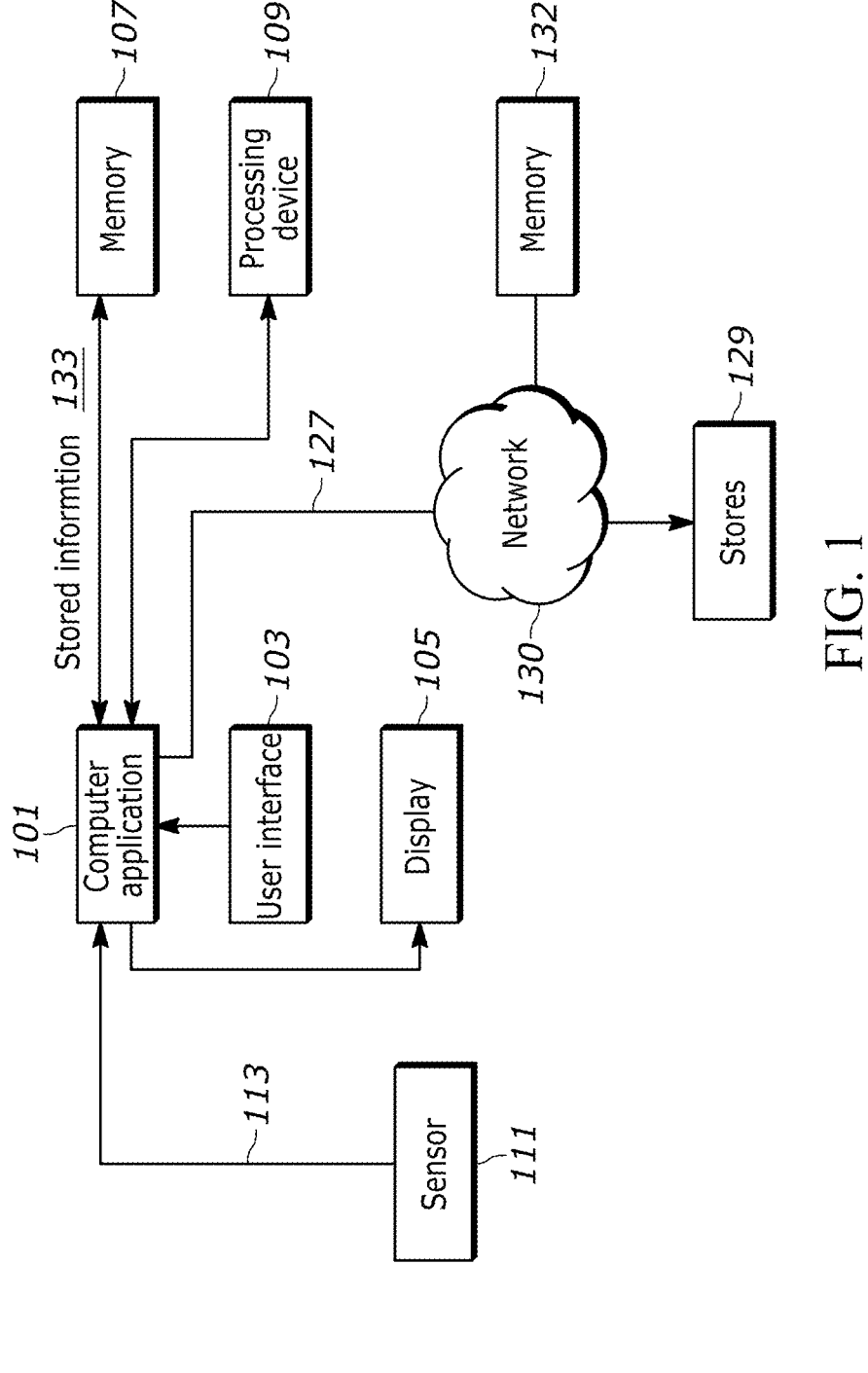
FIG. 1 comprises a block diagram of a system according to various embodiments of the present invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The approaches provided herein relate to a software application and communication approach that is used to facilitate real-time interactions and communications between customers and brick-and-mortar retail stores (e.g., not warehouses or stores with the same brand or same shared inventory or an internet-inventory type stores or marketplaces). These interactions and communications include examining the inventory of the store, making purchases, or reserving items in the store to mention a few examples. In some aspects, different retail stores (sellers) would have different point-of-sales (POS) systems and collectively form a marketplace. In other aspects, the POS systems may be of the same type, technology, system, or equipment model, but form or be different instances for each individual store. These approaches use a computer application (typically deployed on a mobile electronics device) or some combination of computer hardware and/or computer software to perform these functions.

Different databases may be used to store product information. For example, the seller might have a POS database including information about items they are selling such as garments (e.g., tailor measurements for each different type of garment), art (description of the art, colors, genre) and furniture/home goods (e.g., type, color measurements). Other examples are possible.

In some aspects, the computer application would run on a mobile electronics device such as a smartphone or personal computer and use an artificial intelligence (AI) element (or some other machine learning element) to perform different functions. In particular, the AI element may perform various functions including (1) obtaining information from users (via user input or asking questions of users), (2) inferring additional information from the customer information provided, (3) providing virtual fitting functionality (e.g., producing a customer avatar that, for example, is wearing clothing the customer is considering purchasing and displaying this avatar in an appropriate environment), and (4) producing and presenting different informational "feeds" to customers (which the customers can interact). As discussed elsewhere herein, various other functions can also be performed.

As mentioned, the customer may indicate characteristics of products-of-interest (e.g., the size, color, shape, or price of an item), the user's geographic location, or other information to the computer application. Some types of information can be automatically obtained (e.g., the customer's current location). In other specific examples, the customer may enter sizing information including height, weight, waist, inseam, bra, hip or shoe size. They may also answer questions about personal preference in products such as clothing, shoes, personal accessories, art and furniture. This information is used for various purposes as described herein such as to infer additional information about the customer, create informational streams of stores of products that may be considered by the customer, display an avatar, or offer suggestions to the customer.

As mentioned, the computer application is structured to infer or derive additional information from information provided by or known about customers. Various artificial intelligence (AI) approaches can be utilized to determine this information. For example, a user's preference for brown shoes might be inferred from other information entered by the customer. The application may also ask the customer more general questions such as "What do you wear for work?" or "What do you like to wear?" and AI approaches can be used to determine information about the user (e.g., a preference for brown dress shoes) based upon the answers received. This derived information can then be used as a filter to find suitable stores (and/or products) to present to the customer.

As already mentioned, the AI element and/or algorithms described herein may create an avatar visually showing the customer in context with the product. In other aspects, when the user is searching or reviewing the garments, there will be an option for the customer to view the items on him or her (i.e., on the avatar) and/or (as described below) in a setting that suits the item. For example, if the item is clothing the avatar may be of an accurately sized and proportioned customer with the garment (also appropriately and accurately sized and proportioned with respect to the customer) being worn by the customer. In this way, the customer can view the garment and see how it would realistically appear on the customer without having to physically try on the garment.

As mentioned, the avatar can be positioned within different environmental settings or contexts. For example, if the customer were viewing swim wear, then the display rendered to the customer could be the customer (i.e., the customer's avatar wearing the swim garment) next to a pool or on a beach. Or if the customer avatar were shown wearing a golf shirt, then these approaches could render a display showing the customer avatar standing on a golf course holding a club or in a golf cart. The customer would be able to visualize and see himself/herself in the clothes wearing the clothes. Since the customer's avatar is being presented, the customer can virtually try on every item and the results can be visualized as if the customer were actually wearing the item.

In still other aspects, the settings being presented are chosen based upon know customer reactions either from the actual customer or from groups of previous customers. For instance, it may be known that certain settings produce higher sales results or stimulate other desired emotions in customers.

The AI element also produces different "feeds" for customers. The feeds provide different information to customers and may be determined based on a number of different factors. For example, fashion feeds, art feeds, jewelry (including watches) and furniture home goods feeds may be produced and based upon the profile of user, past likes and super likes, and/or past dislikes and super dislikes. The feeds may include listings of stores that may be of interest to the customer or products of interest (or both). Still other information can be included with or displayed with the feeds. For example, a weather report for the location of the retail stores can be included with and/or displayed if the customer is traveling and might desire to visit the retail store. The stores and/or products may be presented as an alphanumeric list, images, hyperlinks, and combinations of these or other elements to mention a few examples.

In order to determine the different feeds, software filtering (e.g., using information provided by a customer or determined about the customer or derived from that information) can be used to find and present potential stores-of-interest (and/or items of potential interest) to customers using the application. In these regards, a large pool of information (e.g., a large pool of potential stores of interest) is narrowed to a manageable amount of information (e.g., a much smaller group of stores of potential interest to the customer) by applying the filter to the larger pool of information.

In other aspects, the application is directly and electronically linked to the inventory/point of sale (POS) system of each store. This allows access by the computer application to the same inventory information as provided to systems in the actual physical store. Real-time purchases and other interactions physically made at or in the store itself by other customers will be visible to the application in real-time. In contrast, current internet-based marketplaces (e.g., stores selling through the Amazon marketplace) have different inventory systems: one inventory/system for their actual physical in-store items and a different inventory/system for items they sell through internet marketplaces.

Once the store, products or other items of interest are located and presented by the application in a feed to the customer, various actions can be taken by the customer. For example, the customer can use the computer application to purchase or order products, have products delivered, reserve products, bookmark the store or the items and save in a favorite list, or ask questions of the store. The approaches presented herein provide a quick, easy, pleasant, and seamless experience for customers as they can easily locate, save and purchase desired products. These approaches also provide advantages for retailers as it avoids the need to maintain separate inventory/POS systems (and having to reconcile separate inventories).

In some aspects, an artificial intelligence (AI) component is provided. The AI component includes: (1) a model that models the customer and the behavior of the customer in a setting suitable for the item(s) being worn by the model, (2) a software filter that produces the streams, (3) a virtual fitting module (e.g., that produces the avatar), and (4) a suggestion module that produces suggestions based upon information supplied.

The model of customer interest in some aspects receives inputs (from the customer and potentially other sources) and produces outputs that are used by other functions of the computer application. The user input may include photograph and measurements of the customer (e.g., waist size, arm length) by personal input or a body scan, answers to questions from the customer, the current geographic location of the customer, and information about products of interest (e.g., size, dimensions, weight) to mention a few examples. The model may be stored locally at an electronic device of the customer or centrally stored at an electronic memory at a central location and thereby accessed by the computer application being executed by the customer. Each customer may have the same model, all customers may share a model, or customers may be grouped into separate individual models where customers at a particular model share certain characteristics (e.g., are of a certain age group, income status, reside in a certain geographical area and so forth).

The outputs include inferred additional information concerning the customer. For example, a user's preference for brown shoes might be inferred from other information entered by the customer.

The computer application may also ask the customer general questions such as "What do you wear for work?" or "What do you like to wear?" and AI approaches implemented by the model can be used to determine further information about the user (e.g., a preference for brown dress shoes) based upon the answers received. This derived information can then be used as a filter to find suitable stores to present to the customer (see below).

Adjustments to and fine-tuning of the model are made, in some examples, according to customer likes/dislikes, purchases of the customer, other customer behavior, and/or additional information. Also, the inventory photos might fine tune the model. For example, photos of the inventory of a customer might show the interests of the customer more accurately than answers to questions (submitted by the customer) and when applied to fine tune the model, allow the model to produce better inferences that, in turn, are used to produce more accurate and better software filters. Better software filters can be used, in turn, to provide a more accurate stream of potential stores and/or products to the customer.

The software filter also has inputs and outputs. The inputs can be customer input and inferred additional information (that has been produced by the model). The outputs of the filter are streams of information that are rendered to the customer on an electronic display. As mentioned, the filter narrows a large pool of potential stores and/or products to a more manageable group of stores and/or products for rendering or presenting to the customer.

Adjustments, modifications, and or fine-tuning to the filter are made according to customer likes/dislikes, customer purchases, customer behavior, and/or additional information. Also, inventory photos (from the customer showing which products they currently own) may be used to fine tune (train) the filter. Photos of the inventory of a customer might show the interests of the customer more accurately than the answers to questions and when applied to fine tune the filter, allow the filter to produce more suitable streams of information (e.g., potential stores of interest or potential products of interest) for rendering to the customer.

In some of these embodiments, a virtual fitting display module is provided and the virtual fitting module renders a virtual fitting that in some examples includes an avatar of the customer. The inputs to this module may include measurements of products or the person to be represented by the avatar. In other aspects, the store or the application may include body scanning approaches or equipment (e.g., cameras and associated scanning programs) that allow a customer to scan themselves, create the avatar, and store the avatar.

In these regards, the avatar is displayed so as to accurately reflect the measurements, size, shape, dimensions, and/other characteristics of the customer. Images or other information showing environmental conditions, particular surroundings, and/or an environmental context may also be inputs to the virtual display fitting module. These images may show the environment where a customer wishes to see a selected product. The output of the virtual fitting display module is virtual fitting display that may include an avatar. These items are output from the module in a displayable format so that they can, for example, be displayed on a computer screen. The virtual display fitting module may be constructed of such hardware and/or software components (including an AI model) so that it can be updated, for example, by customer feedback.

In still other aspects, an inventory suggestion module produces suggestions based on sensed information (e.g., photos, lists, or other information) showing the inventory of products or items of a customer. The inputs to this module may include sensed information (e.g., from cameras, scanners, GPS coordinates from a GPS system). Outputs from the inventory suggestion module may include suggestions to the customer (e.g., "Here are some belts that would go with the jeans"). Other examples are possible.

In many of these embodiments, a computer application is operated on a mobile electronic device and the mobile electronics device has a display. User input is received from a customer at the computer application. The user input includes product interests of the customer.

Additional information is inferred from the user input utilizing an artificial intelligence (AI) model. A software filter is created according to the user input and the inferred additional information. The software filter is actuated to produce one or more informational feeds. The informational feeds include potential retail stores of interest to the customer, and each potential retail store has a unique inventory of products.

The one or more informational feeds are rendered on the display to the customer. A store selection is received from the customer. The store selection indicates one or more of the potential retail stores of interest presented in the informational feeds. For each potential retail store of interest indicated or selected by the customer in the store selection, an electronic connection is made from the computer application to an electronic accounting system of each retail store. The electronic accounting system is adjusted in real-time by events occurring at the retail store. Contents of the electronic accounting system are visible, accessible, and adjustable by the computer application in real time.

At the computer application, a product selection is received from the customer of an item-of-interest from one of the potential retail stores of interest. An action is caused to be performed. The action is one or more of: producing and rendering a virtual fitting of the selected item-of-interest on the display; transmitting electronic purchase instructions for the selected item-of-interest; transmitting an electronic inquiry about the selected item-of-interest; transmitting electronic instructions to reserve the selected item-of-interest for purchase; and/or transmitting electronic instructions that are effective to cause a robot to perform an action with respect to the selected item-of interest.

In aspects, the virtual fitting includes an avatar of the customer or parts of the customer and the selected item-of-interest is virtually displayed on the avatar based on sizing questions concerning body measurements answered by the customer or a body scan and dimensions or characteristics of the selected item-of-interest. In some examples, the avatar is displayed with clothing selected by the customer. In other examples, the virtual fitting shows the avatar and the selected item-of-interest within a specific environmental context.

In other aspects, the informational feeds include fashion feeds, art feeds, furniture feeds and/or home goods feeds. Other examples are possible.

In other examples, the AI model is trained prior to usage. In yet other examples, the computer application is configured to access databases for each potential retail store of interest selected by the customer.

In some other aspects, the computer application receives customer likes and dislikes of the item-of-interest from the customer. These likes and dislikes can be used for various purposes such as fine-tuning the models and product feeds described herein.

In other examples, the sensed information is received of an inventory of the customer and the software filter and/or model are adjusted according to the sensed information. In examples, the sensed image may be a photograph. In aspects, a suggestion module provides suggestions to the customer based upon the sensed information.

In others of these embodiments, a system, comprises an electronic processing device, a display coupled to the electronic processing device, a memory coupled to the electronic processing device, a user interface coupled to the electronic processing device, and a computer application that is stored in the memory and executed by the electronic processing device.

The electronic processing device is configured to receive user input from a customer via the user interface upon execution of the computer application. The user input includes product interests of the customer.

The computer application when executed by the processing device is further configured to: utilize an artificial intelligence (AI) model to infer additional information about the customer from the user input; create a software filter according to the user input and the inferred additional information; actuate the software filter to produce one or more informational feeds, the informational feeds including potential retail stores of interest to the customer, each potential retail store having a unique inventory; render the one or more informational feeds on the display to the customer; and/or receive a store selection from the customer via the user interface, the store selection indicating one or more of the potential retail stores of interest presented in the informational feeds on the display.

The computer application is further configured to, for each potential retail store of interest indicated by the customer in the store selection, electronically form an electronic connection to an electronic accounting system of each retail store, the electronic accounting system being adjusted in real-time by events occurring at the retail store. Contents of the electronic accounting system being visible, accessible, and adjustable by the computer application in real time.

The computer application is further configured to receive a product selection from the customer via the user interface. The product selection indicates an item-of-interest from one of the potential retail stores of interest The computer application causes an action to be performed. The action is one or more of: producing and rendering a virtual fitting of the selected item-of-interest on the display; transmitting an electronic message to purchase the selected item-of-interest; transmitting an electronic inquiry about the selected item-of-interest; transmitting an electronic message to electronically reserve the selected item-of-interest for purchase; and/or transmitting electronic instructions to cause a robot to perform an action with respect to the selected item-of interest.

Referring now to FIG. 1, a system 100 includes a computer application 101, a user interface 103, a display 105, an electronic memory 107, a processing device 109, a sensor 111, a network 130, and stores 129. The computer application 101, user interface 103, display 105, electronic processing device 109 and/or sensor 111 may be incorporated into or within a mobile electronic device such as a smartphone, laptop, or personal computer to mention a few examples.

The stores 129 are retail establishments and may sell any combination of products directly to retail customers. In one preferred example, the stores 129 are each independently owned or controlled retail establishments. In aspects, the computer systems (e.g., the inventory system or POS system) of each of the stores 129 are not electronically linked to each other and/or are not capable of directly communicating or sharing information with each other. For instance, the inventory system of a first store cannot communicate with the inventory system of a second store (and vice versa). The various electronic systems in one store (e.g., the point-of-sale system, the inventory system, the shipping system, the accounting system) are electronically unconnected and electronically unreachable from the same types of systems in others of the stores 129. Activities (e.g., sales, returns, or merchandise holds to mention a few examples) that affect or adjust the inventory in one retail store do not affect the inventory in other retail stores. In other words, actions such as purchases, returns, or reserving products that result in adjusting an inventory number in one store do not affect or adjust the inventory in other stores.

In aspects, the stores 129 operate and are managed independently of each other. As mentioned, certain types of information is not shared between the stores 129 as there are no electronic connections between electronic devices in the stores.

The network 130 is any electronic communication network or combinations of these networks. In examples, the network 130 may be the internet, a wireless network, a cellular network, a local area network, a wide area network, or combinations of these or other networks. Other examples of networks and combinations of networks are possible.

The user interface 103 is any type of device, apparatus, or member that allows a customer to interact with the computer application 101. In examples, the user interface 103 is one or more of a keyboard, switches, buttons, a computer mouse, or the like. In other aspects, the user interface 103 may include a microphone that is configured to allow the customer to enter voice data. In other aspects, the user interface 103 may include a camera (or other scanning equipment or sensors) to take body scans and/or pics for use in sizing or upload to the interface to share with other users, including sellers. In other examples, the user interface 103 may be incorporated as a touch screen in the display 105. That is, a customer may touch icons, areas, portions, hyperlinks, and/or or other visual indicators on the screen to interact with the computer application 101.

The display 105 is any type of electronic display that displays text, images, files, web sites, or any other visible object or objects. In examples, the display 105 (along with other elements) may be incorporated in a smartphone, tablet, or personal computer to mention a few examples of electronic devices.

The electronic memory 107 is any type of electronic memory or database such as a random access memory (RAM), read only memory (ROM), electronically erasable programmable read only memory (EEPROM), any combination of these devices, or any other type of electronic memory device or combination. The electronic memory 107 is a local memory in an electronic device. However, an optional external memory 132 that is external from the electronic device can also be used. Finally, a combination of the local memory 107 and the external memory 132 may be used.

As mentioned, in some aspects the memory 107 is a local memory and disposed at the electronic device. The memory 107 may be pre-loaded with information. For example, information may be downloaded from some external source via the network 130 and use the processing device 109 to perform the downloading. The information downloaded may include product information such as the dimensions, sizes, weights, colors, and other characteristics of products. When the electronic device is a smart phone, the memory 107 is the same memory used by the smart phone for other purposes related to the operation of the smart phone.

The external memory 132 may be a database or part of a database system and may be a random access memory (RAM), read only memory (ROM), electronically erasable programmable read only memory (EEPROM), any combination of these devices, or any other type of electronic memory device or combination. As with the memory 107, the memory 132 may be pre-loaded with information, for example information concerning products. In aspects, the external memory 132 is external to a device (e.g., smartphone, personal computer, or tablet) incorporating the memory 107 and is disposed at a central location such as a headquarters, central operations center, command center, or some other suitable location.

The processing device 109 is any type of electronic processing device or processor such as a microprocessor that executes programmed computer instruction. The processing device 109 may have a separate electronic memory that stores these instructions. The processing device 109 may be the same processing device used by the electronic device of the customer. For example, when the electronic device is a smart phone, the processing device 109 may be the processing device or devices of the smart phone. In these regards, the processing device 109 may provide other functionality associated with the smart phone (e.g., processing calls, or accessing, interacting with, and/or providing content from the internet to mention a few examples).

In aspects, the computer application 101 includes an artificial intelligence (AI) element (or some other machine learning element) to perform different functions. In particular, the AI element may perform various functions including (1) obtaining information from users (via user input or asking questions of users), (2) inferring additional information from the customer information provided, (3) providing a virtual fitting (producing a customer avatar and displaying this avatar appropriately), and/or (4) producing and presenting different informational "feeds" to customers (which the customers can interact). Other functions may also be provided and it will be appreciated that this is not an exclusive list of functionality.

A customer may indicate characteristics of products-of-interest (e.g., the size, color, shape, or price of an item), the geographic location of the customer, or other information to the application. Some information may also be automatically obtained (e.g., the customer's current location via the sensor 111 as sensed information 113). In other specific examples, the customer may enter sizing information via the user interface 103 including height, weight, waist, inseam, bra or hip size. They may also answer questions about personal preference in products such as clothing, shoes, personal accessories, art and furniture. The questions may be answered in several different ways including having the customer fill out a questionnaire presented on the display 105 by typing answers and speaking answers into a microphone.

In other aspects, the computer application 101 is configured to infer or derive additional information from other information provided by or known about customers. Various artificial intelligence (AI) approaches can be utilized to determine the inferred information. For example, a user's preference for brown shoes might be inferred or derived from other information entered by the customer or from previous purchases made by the customer. The computer application 101 may also ask the customer more general questions such as "What do you wear for work?" or "What do you like to wear?" and AI approaches can be used to determine additional information about the user (e.g., a preference for brown dress shoes) based upon the answers received. This derived information can then be used as a filter to find suitable stores and/or products to present to the customer.

As already mentioned, the AI element of the computer application 101 may create an avatar and render it on the display 105 where the avatar shows the customer in an environmental context with the product. By "avatar," it is meant an icon or figural representation of a specific person or other object that is rendered on the display 105. In many of the examples described herein, the avatar is a specific and realistic representation of a particular person scaled to the particular body dimensions of the person (height, arm length, etc.) and may include all particular facial features, particular body shapes and contours of the customer's body, and other characteristics of the person. The avatars described herein typically are described as being avatars of customers. However, in other examples, the avatar may be any object or collection of objects (e.g., specific art works or other objects). Other examples of avatars are possible. In still other aspects, body scanning approaches or equipment (e.g., a camera and associated software that obtains an image and processes the image into an avatar) can be used.

In one example and when the customer is searching or reviewing garments, there can be an option presented to the customer for the customer to view the items on him or her (i.e., on the avatar that is rendered on the display 105) and (as described below) in a setting, environment, or environmental context that suits the item. For example, if the item is clothing the avatar may be of an accurately sized and proportioned customer with the clothing (also appropriately sized and proportioned) being worn by the customer. In this way, the customer can view the garment and see how it would appear on the customer without having to physically try on the garment.

As mentioned, the avatar can be positioned within different environmental settings or contexts. For example, if the customer were viewing swim wear, then the picture rendered on the display 105 could be the customer (i.e., the customer's avatar wearing the swim garment) next to a swimming pool or beach. Or if the customer avatar were displayed with a golf shirt, then a images could be created showing the avatar of customer wearing the golf shirt and standing on a golf course holding a club or in a golf cart. The customer would be able to visualize and see himself/herself in the clothes wearing the clothes in realistic environments. The customer can virtually try on every item and the results can be visualized as if the customer were actually wearing the items.

The AI element of the computer application 101 also produces different "feeds" for customers that are rendered on the display 105. The feeds are visual displays of information that may dynamically change or evolve over time and provide different information to customers and may be determined based on a number of different factors and provide different content. For example, fashion feeds, art feeds, and furniture home goods feeds may be produced and the contents of these feeds based upon the profile of user, past likes and super likes, past dislikes and super dislikes to mention a few examples. The feeds may include stores that may be of interest to the customer or products of interest (or both).

In order to determine the content of the different feeds, the computer application 101 uses software (or other types of) filtering (e.g., using information provided by a customer or determined about the customer or derived from that information) that can be used to find and present potential stores-of-interest (or other items of potential interest) to customers using the computer application 101.

In other aspects, the computer application 101 is directly and electronically linked via the network 130 to the stores 129 and, in some aspects, the inventory system of each of the stores 129. This allows access by the computer application 101 to the same inventory information as the physical store. Real-time purchases and other interactions made at the store 129 itself by other customers will be visible to the application in real-time.

Once the store and/or products or other items of interest are located and presented by the application in a feed to the customer, various actions can be taken by the customer. For example, the customer can use the computer application 101 to purchase or order products, have products delivered, reserve products, or ask questions of the store. The approaches provided herein offer a quick, easy, pleasant, and seamless experiences for customers as they can easily locate and purchase desired products. These approaches also provides advantages for retailers as it avoids the need to maintain separate inventory/POS systems (and having to reconcile separate inventories).

In one example of the operation of the system 100 of FIG. 1, the computer application 101 is operated on a mobile electronic device and the mobile electronics device includes the display 105. User input is received from a customer at the computer application 101 via the user input 103. The user input includes products of interest to the customer.

Additional information is inferred from the user input utilizing an artificial intelligence (AI) model that is incorporated into the computer application 101. A software filter is created by the computer application 101 according to the user input and the inferred additional information. The software filter is actuated to produce one or more informational feeds, the informational feeds including potential retail stores 129 of interest to the customer. Each potential retail store 129 has a unique product inventory.

The informational feeds are rendered on the display 105 to the customer. A store selection is received from the customer via the user interface 103. The store selection indicates one or more of the potential retail stores of interest presented in the informational feeds. For each potential retail store of interest indicated by the customer in the store selection, an electronic connection is made via the network 130 from the computer application 101 to an electronic accounting system of each retail store 129. The electronic accounting system is adjusted in real-time by events occurring at the retail store 129. Contents of the electronic accounting system are visible, accessible, and adjustable by the computer application 101 in real time.

At the computer application 101, a product selection is received from the customer of an item-of-interest located in one of the potential retail stores 129 of interest. An action is caused to be performed. The action may be performed by the computer application 101 (as it is executed by the processing device 109) and is one or more of: producing and rendering a virtual fitting of the selected item-of-interest on the display 105; transmitting electronic purchase instructions for the selected item-of-interest from the computer application 101 to one or more of the retail stores 129 via the network 130; transmitting an electronic inquiry from the computer application 101 to one or more of the retail stores 129 via the network 130 about the selected item-of-interest; transmitting electronic instructions from the computer application 101 to one or more of the retail stores 129 via the network 130 to reserve the selected item-of-interest for purchase; and/or transmitting electronic instructions from the computer application 101 to one or more of the retail stores 129 via the network 130 that are effective to cause a robot to perform an action with respect to the selected item-of interest.

Figure 2:
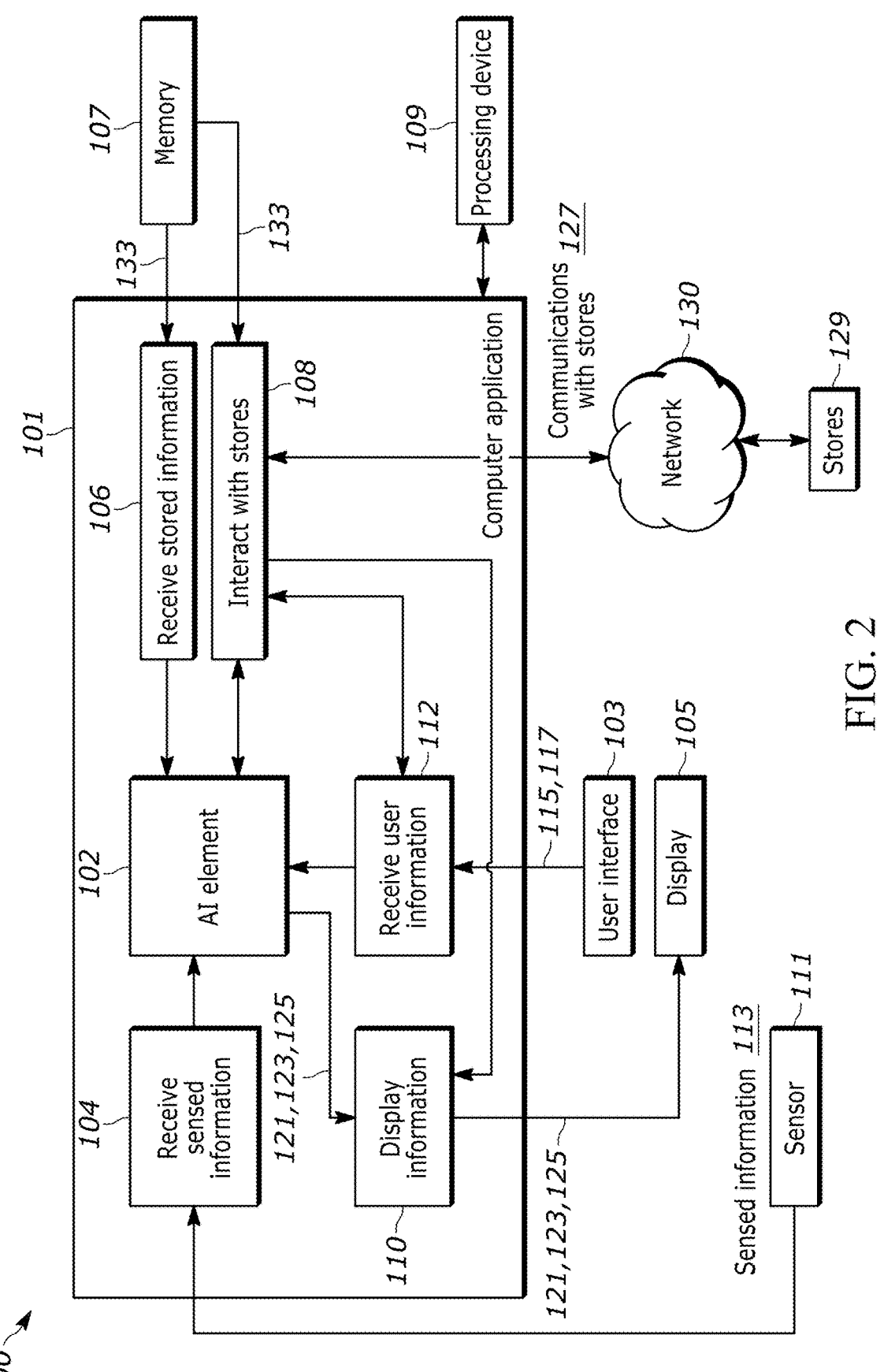
FIG. 2 comprises a block diagram showing details of the computer application element of FIG. 1 according to various embodiments of the present invention.

Referring now to FIG. 2, an example of a computer application 101 is described in greater detail. The computer application 101 includes an artificial intelligence (AI) element 102, a receive sensed information module 104, a receive stored information module 106, an interact with stores module 108, a display information module 110, and a receive user information module 112.

The AI element 102 may be structured or configured as combinations of computer software, artificial intelligence models (e.g., neural networks). In some aspects, the AI element 102 includes: (1) an AI model (e.g., a neural network) that models the customer and the behavior of the customer, (2) a software filter that produces the streams, (3) a virtual fitting module (e.g., produces the avatar), and (4) a suggestion module that produces suggestions based upon information supplied. These structures may be stored in the memory 107 (or external memory 132) and executed or interacted with by the processing device 109.

The receive sensed information module 104 receives sensed information 113 from the sensors 111. As mentioned, the sensors 111 may be cameras (e.g., sending inventory related information that is used to determine suggestions), scanners, or GPS sensors (e.g., that are used to determine a customer's location) to mention a few examples. The receive sensed information module 104 converts the received information from one electronic format to another electronic format, for example, into a format that is recognizable and usable by the AI element 102. The received sensed information module 104 may be constructed of any combination of hardware or software, for example, software instructions (stored in the memory 107 or external memory 132) that are executed by the processing device 109.

The receive stored information module 106 receives stored information 133 from the memory 107. The receive stored information module 106 converts the received information from one electronic format to another electronic format, for example, into a format that is recognizable and usable by the AI element 102. The received stored information module 106 may be constructed of any combination of hardware or software, for example, software instructions (stored in the memory 107 or external memory 132) that are executed by the processing device 109.

The interact with stores module 108 transmits and receives communications with stores 127 with the stores 129. For example, user selections of products are processed by the interact with stores module 108. These product selections are processed into electronic messages, which are sent to the stores 129. The interact with stores module 108 interacts with the accounting system (and other store computer systems) and has direct visibility, control, and/or the ability to conduct interactions with this accounting system. Appropriate electronic control messages are also formed by the interact with stores module 108 based upon the instructions of a customer (received via the receive user information module 112) and potentially from the AI element 102.

The interact with stores module 108 transmits and receives messages and information to and from the stores 129. For example, the stores 129 may transmit messages or other information, which is received by the interact with stores module 108. This information may be sent to the AI element 102 and the display information module 110 (for display to the customer). The interact with stores module 108 may be constructed of any combination of hardware or software, for example, software instructions (stored in the memory 107 or external memory 132) that are executed by the processing device 109. In aspects, the interact with stores module 108 receives messages, analyze messages, and routes messages in the appropriate format to appropriate other system elements. In other examples, the interact with stores module 108 transmits messages, instructions, and/or other information to the stores 129 to make purchases, reserve items, make inquiries, or return items to mention a few examples.

The display information module 110 sends information for display including virtual fitting information 121, informational streams 123, and suggestions 125. The display information module 110 converts the received information from one electronic format used by the AI element 102 to another electronic format that is recognizable and usable by the display 105. As mentioned, the display information module 110 may receive information from different sources including the AI element 102 and the interact with stores module 110 and potentially the receive user information module 112. The display information module 106 may be constructed of any combination of hardware or software, for example, software instructions (stored in the memory 107 or external memory 132) that are executed by the processing device 109.

The receive user information module 112 receives user inputs 115 and likes/dislikes 117 from the user interface 103. The receive user information module 112 converts the received information from one electronic format to another electronic format, for example, into a format that is recognizable and usable by the AI element 102. The receive user information module 112 may be constructed of any combination of hardware or software, for example, software instructions that are executed by the processing device 109.

In one example of the operation of the system of FIG. 2, the computer application 101 is operated on a mobile electronic device such as a smartphone and the mobile electronics device includes the display 105. User input 115 is received from a customer, and user likes and dislikes 117 are received from the user interface 103 at the receive user information module 112, which processes the user input 116 and user likes and dislikes 117 into a form that can be used by the AI element 102. For example, the customer may be prompted with questions to answer. The sensor 111 (e.g., a GPS sensor) produces the sensed information (e.g., information indicating the coordinates or location of the customer), which is received by the received sensed information module 104. The received sensed information module 104 processes the sensed information 113 into a format that is usable by the AI element 102. Stored information 133 (e.g., product information) is received from the memory 107 at the received stored information module 106. The received stored information module processes the stored information 133 into a format that is usable by the AI element 102.

The AI element 102 uses the sensed information 113, the user inputs 116, the user likes and dislikes 117, and the stored information 133 for various purposes. The AI element 102 determines inferred information about the customer and produces one or more informational feeds 123 including potential retail stores of interest to the customer. In aspects, each potential retail store has a unique inventory of products.

The one or more informational feeds 123 are sent to the display information module 110, which processes the informational feeds 123 into a displayable form so that they can be rendered on the display 105 to the customer. When the feeds include stores, a store selection is made by the customer via the user interface 103 and received from the customer at the receive user information module 112, which converts the information into a format usable by the interact with stores module 108. The store selection indicates one or more of the potential retail stores of interest presented in the informational feeds. For each potential retail store of interest indicated by the customer by the store selection, an electronic connection is made from the interact with stores module 108 of the computer application 101 to an electronic accounting system of each retail store 129. The electronic accounting system of the retail store 129 is adjusted in real-time by events occurring at the retail store. Information used or maintained by the electronic accounting system (e.g., inventory numbers and/or other specific product information) is visible, accessible, and/or adjustable by the computer application 101 in real time. For example, any interactions made by the computer application 101 that would affect inventory numbers (maintained by the accounting system of the store 129) would cause the accounting system of the store 129 to adjust those numbers. In other examples, the computer application 101 may be used by the customer to inquire as to the inventory number of a product causing the accounting system of the store 129 to respond to the computer application 101 by sending the computer application 101 the requested inventory number.

Products of interest can then be rendered on the display 105 to the customer and a product selection can be made by the customer. At the receive user information module 112 of the computer application 101, a product selection is received from the customer of an item-of-interest from one of the potential retail stores of interest. An action is caused to be performed. In examples, after a store selection is made by the customer, the customer can select and/or is presented with products of interest. The products of information can be presented in the same or different informational feed that was used to render the store information.

The action can be a variety of different actions. The AI element 102 can produce and cause the of rendering a virtual fitting of the selected item-of-interest on the display via the display information module 110. Electronic purchase instructions for the selected item-of-interest may be transmitted from the interact with stores module 108 of the computer application 101 to the stores 129. An electronic inquiry about the selected item-of-interest can be transmitted from the interact with stores module 108 to the stores 129. Electronic instructions can be transmitted from the interact with stores module 108 to the stores 129 to reserve the selected item-of-interest for purchase. Electronic instructions that are effective to cause a robot to perform an action with respect to the selected item-of interest can be transmitted from the interact with stores module 108 to the stores 129.

Figure 3:
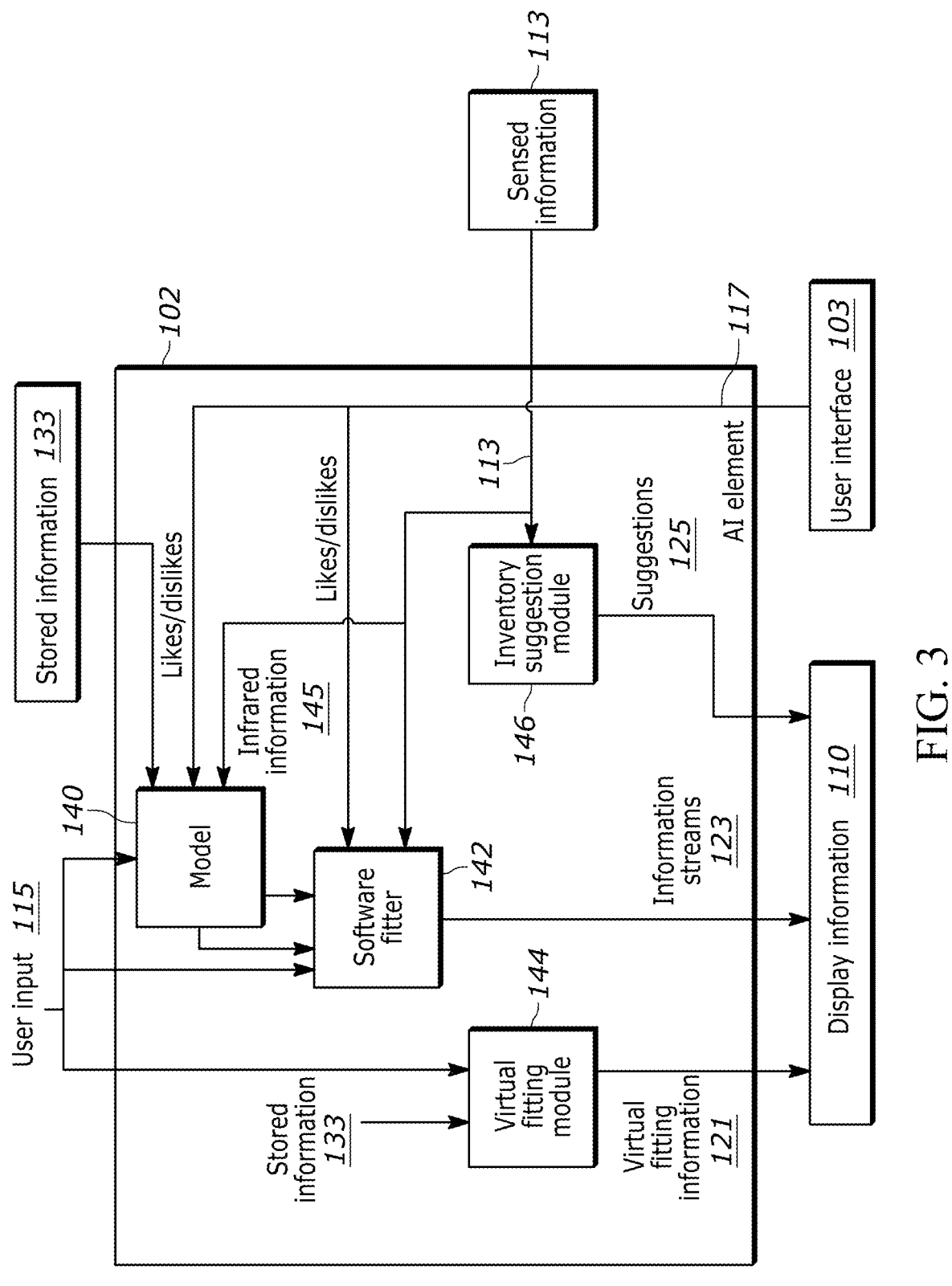
FIG. 3 comprises a block diagram of the details of the artificial intelligence (AI) element of FIG. 2 according to various embodiments of the present invention.

In aspects, virtual fitting information can be displayed on the display 105 by the AI element 102. In aspects, the virtual fitting information includes an avatar of the customer (or parts of the customer) and the selected item-of-interest is virtually displayed on the avatar based on sizing questions concerning body measurements answered by the customer and dimensions or characteristics of the selected item-of-interest. In some examples, the avatar is displayed with clothing selected by the customer. In other examples, the virtual fitting shows the avatar and the selected item-of-interest within a specific environmental context. The environmental context can be selected by the customer or automatically selected by the AI element 102 of the computer application 101. In other aspects, when the item being worn by the customer is being displayed, the avatar may be wearing other items, which may be available for purchase. For example, the avatar may be wearing jewelry (in addition to clothing selected by the customer). The additional items may be items the application 101 has determined the customer may wish to purchase (as determined by the AI element 102 based upon the customer's purchase history, interest, or other factors). In other examples, stores may cause the application to inset items to be displayed on the avatar for an advertising fee, Referring now to FIG. 3, one example of the AI element 102 used by the computer application 101 is described in greater detail. The AI element 102 includes a model 140, a software filter 142, a virtual fitting module 144 and an inventory suggestion module 146. Various ones of these elements receive user input 115, sensed information 113, stored information 133, and likes and dislikes 117.

The model 140 may include or utilize an AI model such as a neural network. However, the model 140 may also use any combination of computer hardware and/or computer software to implement its functions. One example of the model 140 is described below with respect to FIG. 8.

Each customer may have the same model 140 (i.e., all customers may share a model that may be maintained at a central location such as the external memory 132), each customer may have a different model 140 (e.g., and stored locally at the memory 107 of the electronic device where the computer application 101 resides), or customers may be grouped into separate individual models (maintained at a central location such as the external memory 132) where customers at a particular model share certain characteristics (e.g., are of a certain age group, income status, reside in a certain geographical area and so forth).

The model 140 receives various inputs and produces various outputs. The inputs include the user inputs 115, stored information 133, likes and dislikes 117, and sensed information 113. The user input 115 may include measurements (e.g., of the customer or products), various information concerning products of interest (and this type of information could also be stored in the memory 107 and input into the model 140 as stored information 133). The stored information 133 can include this type of information but may also include any other information that is stored such as product information or store information.

As will be explained in greater detail below, in some aspects the model 140 is trained. Training data sets may be applied to the model 140 during a training process. The training process alters the physical structure of the model 140. For example, when the model is a neural network, weights, nodes, edges, and other structures of the neural network are adjusted. The goal of the training process is to allow the model 140 to make accurate and/or meaningful inferences about the customer including customer preferences. These inferences can be inferred from the input information but may not be readily apparent from examination of the input information.

In one example of the training process data from the customer is used. For example, previous known data concerning the purchases and preferences of the customer are applied to the model 140, and the model 140 is adjusted based upon a difference between the actual result produced by the model and the expected results. For example, the weights used in a neural network between different layers in the neural network may be adjusted. In other examples, data from other customers with similar backgrounds and demographics is used to train a model for the current customers. Combinations of different training data sets may be used, for example, some data from the current customer and other data from other and different customers.

Once the model 140 is trained, the above-mentioned inputs are applied to the model 140 and outputs are created. The outputs include inferred information 145, which is sent to the software filter 142. For example, a customer's preference for brown shoes might be inferred from other information entered by the customer.

The computer application 101 may also ask the customer more general questions such as "What do you wear for work?" or "What do you like to wear?" The answers to these questions may be applied to the model 140 and the model responsively produces further inferred information about the customer (e.g., a preference for brown dress shoes) based upon the answers received. This derived information can then be used as a filter to find suitable stores to present to the customer.

Adjustments to the model 140 may be made according to likes/dislikes, purchases, customer behavior, and/or additional information. In other examples, inventory photos can be taken by the customer, for example, of the clothing inventory they have in their closet or dresser. In other examples, the application may be allowed to locate or access photos (e.g., stored in the customer's smartphone, computer, or other location) and scan the photos to obtain or determine the customer's fashion data along with the context of the photos. In one example, the application may find photos of the customer stored in the customer's smartphone of the customer, with the customer at the beach, playing golf, or at dinner and store determine the context of the photo (e.g., the customer is at the beach because he is wearing a bathing suit and the ocean is visible, the customer is playing golf because he is holding a golf club, the customer at dinner because she is eating). These photos may be received by the model and used to fine tune the model (e.g., the photos might show the interests of the customer more accurately than other types of information) and allow the model 140 to produce better inferences. In other words, the model learns and is trained as the photos are processed.

Figure 9:
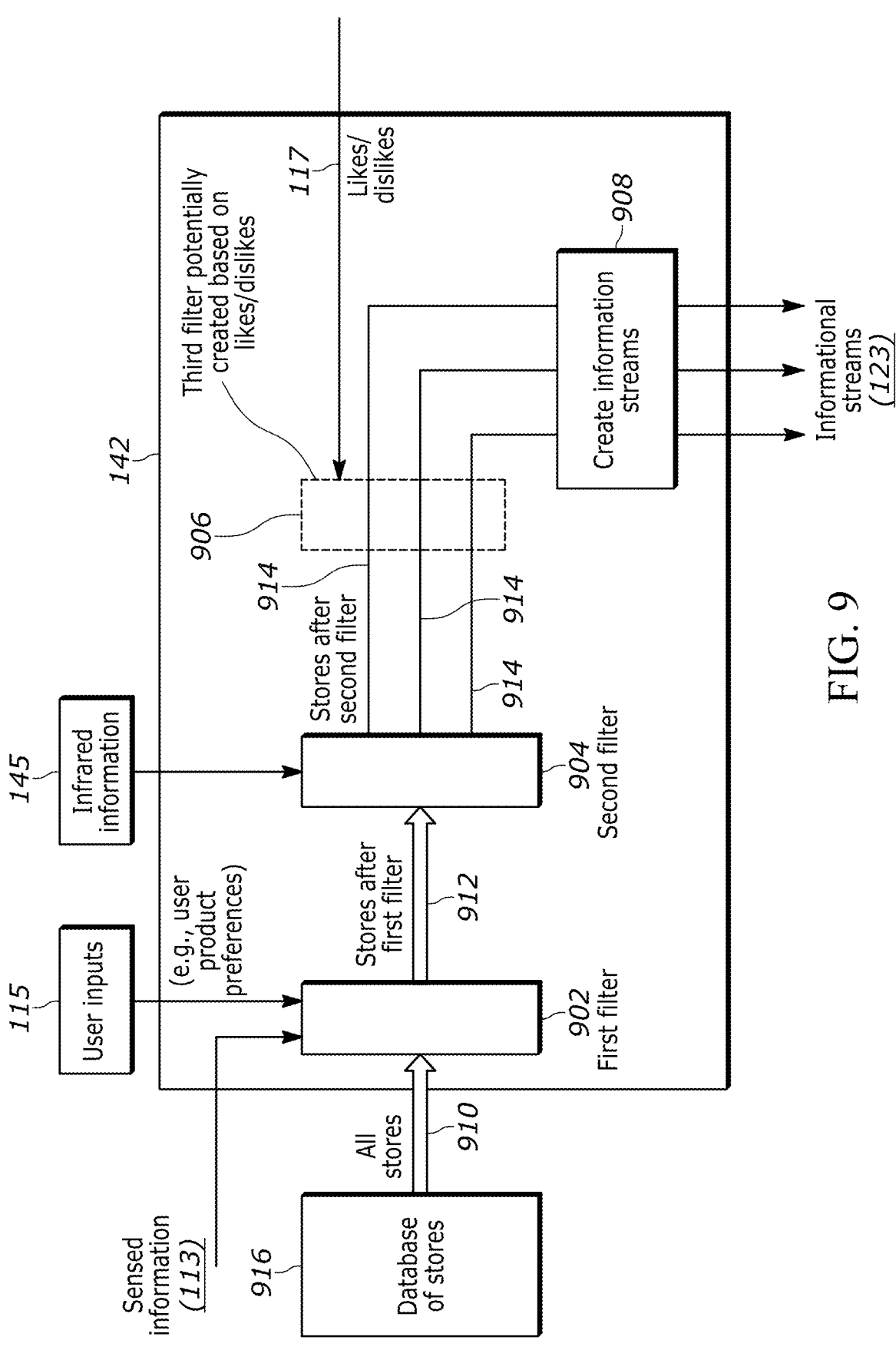
FIG. 9 comprises a block diagram of the software filter of FIG. 3 according to various embodiments of the present invention.

The software filter 142 produces the informational streams 123 based upon user input 115 and inferred information 145. One example of a software filter 142 is shown in FIG. 9. The software filter 142 filters a large pool of potential stores and/or potential products of interest to produce a more manageable number for presentation in the informational streams 123.

Adjustments to the software filter 142 are made according to various sources. For example, customer likes and dislikes 117, purchases made by the customer, other customer behavior, and additional information may be used to adjust or fine-tune the software filter 142. Also, inventory photos as mentioned above might be used to fine tune (or train) the software filter 142 (e.g., to show the interests of the customer more accurately thereby producing better informational streams 123). Further, the inferred information 145 may also be used to fine-tune the software filter 142.

The virtual fitting module 144 displays virtual fittings to customers. A virtual fitting may include an avatar, where the avatar is an accurate visual representation the customer or parts of the person and a product (e.g., clothing or watch) is virtually displayed on the customer avatar with the display being based, for example, on dimensions of the customer, dimensions of the clothing, and other information. As mentioned, this information may be provided in the answers to sizing questions concerning body measurements answered by the customer and/or measurements or characteristics of the product supplied by the clothing manufacturer to mention a few examples.

As mentioned, the virtual fitting display module 144 renders a virtual fitting that might include an avatar of the customer. Environmental conditions or context may also be supplied as inputs to the virtual fitting display module 144. Environmental conditions or context includes the environment in which to display the customer avatar wishes to see a selected item. For example, when the avatar is to be shown wearing swimwear, then the environmental conditions of context may be a background showing a beach or swimming pool. The customer may specify the environmental conditions or context. Alternatively, the model 140 may be used to infer the environmental conditions or context and the inferred environmental conditions or context sent from the model 140 sent to the virtual fitting display module 144.

The output of the virtual fitting display module 144 may be a virtual fitting that might include a customer avatar and include an environmental context. These items may be output in a displayable format so that they can, for example, be displayed on a computer screen (e.g., the display 105). The virtual fitting module 144 may be constructed of any combination of computer hardware and/or software components (including an AI model or models such as neural networks) so that it can be updated, for example, by customer feedback.

The inventory suggestion module 146 determines suggestions to the customer based upon the inventory of items a customer has. For example, a photo (or sensed information like barcodes, QR codes) is taken of an inventory of the customer (art of the customer, clothing of the customer, shoes of the customer, accessories of the customer, watches of the customer, the furnishings of the customer, or automobiles of the customer to mention a few examples). The inventory suggestion module 146 analyzes the information and determines suggestions that are offered to the customer.

In one specific example, the inventory suggestion module 146 produces suggestions 125 based on sensed information. The sensed information may include photos taken from cameras, scans of product tags obtained from scanners, and GPS location coordinates obtained from a GPS system. Outputs of the inventory suggestion module 146 may include suggestions to the customer (e.g., "Here are some belts that would go with the jeans"). In examples, the inventory suggestion module 146 may be configured to seek out additional information once a suggestion has been determined. In the present example, once the inventory suggestion module 146 determines that a suggestion to purchase belts will be presented to the customer, the inventory suggestion module 146 will independently seek out suitable belts for presentation. In these regards, it may establish internet connections to appropriately determined websites and then investigate and analyze information on these websites. If it determines that the information would be valuable to the customer, this information may be rendered to the customer. The inventory suggestion module 146 may be constructed of any combination of hardware and/or software components (including an AI model or models such as neural networks).

Figure 4:
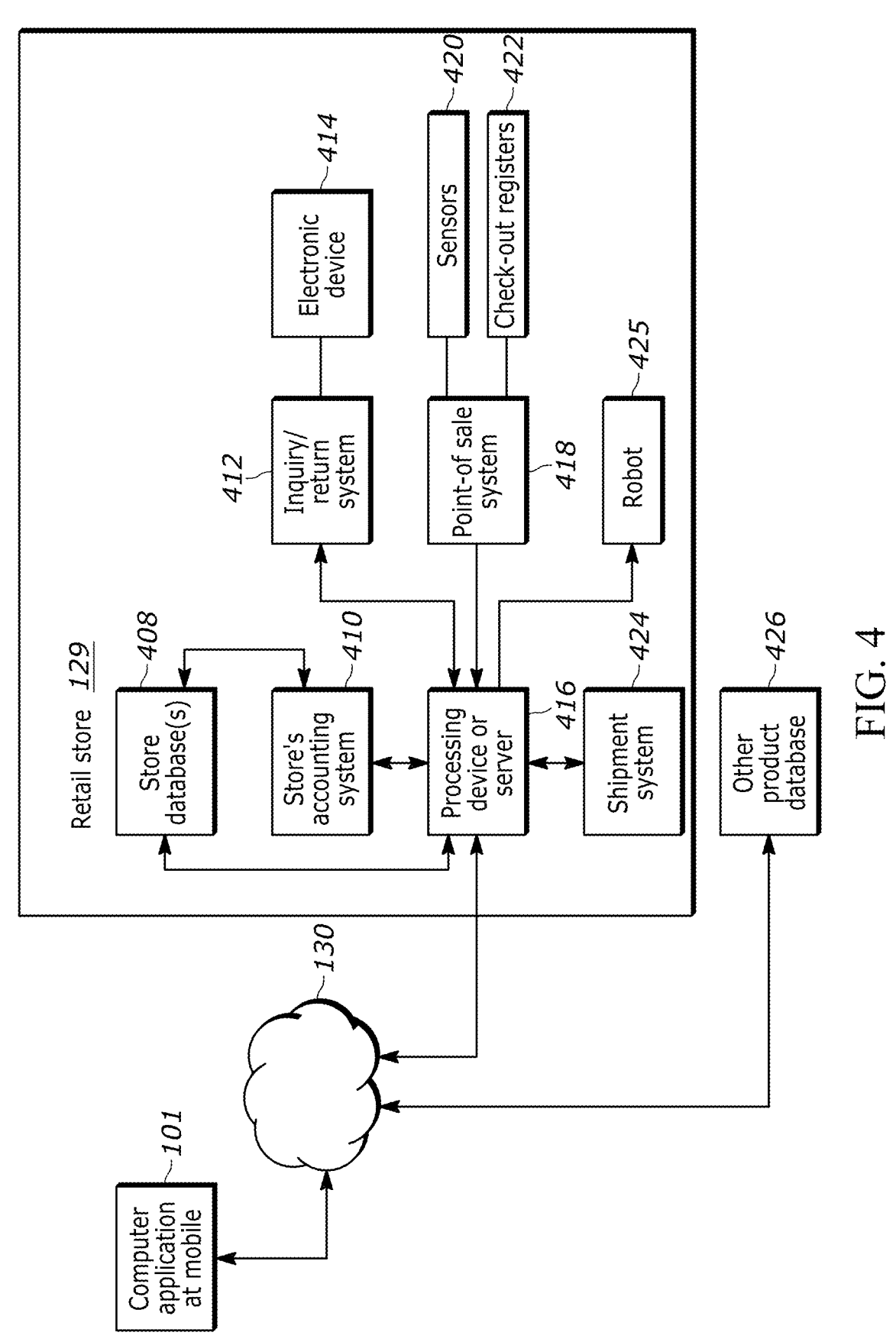
FIG. 4 comprises a block diagram of computer systems and other electronic devices of a retail store according to various embodiments of the present invention.

Referring now to FIG. 4, one example of the computer system structure and architecture utilized by one of the retail stores 129 is described. The retail store 129 includes store data bases 408, a store accounting system 410, an inquiry and/or return system 412, an electronic device 414, a processing device and/or server 416, a point-of-sale system 418, sensors 420, check-out registers 422, a shipment system 424, and a robot 425. An other products database 426 (not part of the retail store 129) may also be accessed. In aspects, many of the elements at the store operate in parallel with respect to each other. For example, instructions can be received and processed by the processing device and/or server 416 from the computer application 101 at the same time purchases are being processed by the point-of-sale system 418. Shipments can be processed by the shipment system 424 while either of these events are occurring. Other examples are possible. In this way, system speed and efficiency is increased.

Store databases 408 may include any type of electronic memory device or combination of memory devices. For example, the store data bases 408 may be a random access memory (RAM), read only memory (ROM), electronically erasable programmable read only memory (EEPROM), any combination of these devices, or any other type of electronic memory device or combination of these elements. The store databases 408 may store accounting information, product information, customer information, or any other type of information used by the store 129.

The store's accounting system 410 is any combination of hardware and/or software that implements or provides accounting, inventory control, or similar functions for the store 129. For example, the store's accounting system 410 may track inventory, expenses, profits, and other information. In one example, the accounting system 410 tracks inventory and is accessible and visible to the computer application 101 and events that occur in the store. In some examples, portions of the accounting system 410 may be visible (e.g., for the purpose of inventory tracking) are visible to the computer application 101 while other functions (e.g., displaying or obtaining profits or expenses of the store 129) are not visible or accessible to the computer application 101. The accounting system 410 may be implemented, in aspects, by software at a processing device such as the processing device and/or server 416 or a separate or dedicated processing device or server.

The inquiry and/or return system 412 is any combination of computer hardware and/or software elements that are utilized to receive and respond to user inquiries and product return requests. For example, the customer may have an inquiry and the inquiry and/or return system 412 receives the inquiry and facilitates a responds. For example, the inquiry and/or return system 412 may interface with a store attendant or customer service worker who is tasked with answering the inquiry. The inquiry and/or return system 412 may be implemented by a processing device executing computer software, for example, by the processing device and/or server 416 or some other dedicated processing device.

The electronic device 414 may be any type of electronic device that is used to make a customer purchase. This electronic device 414 may be utilized by a customer who is physically present and shopping in the store 129. For example, the electronic device 414 may be a smartphone, personal computer or laptop to mention a few examples. In some aspects, the computer application 101 may be implemented at the electronic device 414. In these regards, multiple instances of the computer application 101 may be used and simultaneously operated from different mobile electronic devices by different customers at different locations including from within the store 129.

The processing device and/or server 416 is an electronic device that receives communications from the computer application 101 and transmits communications from the computer application 101. The processing device and/or server 416 also is in electronic communication with the store's databases 408, accounting system 410, inquiry and/or return system 412, a point-of-sale system 418, shipment system 424, and robot 425. These store systems interact with each other and with the computer application 101 via the processing device and/or server 416. In these regards, the processing device and/or server 416 may route messages between a source and a destination where the source and the destination are any of the above-mentioned devices or systems. The processing device and/or server 416 may include a microprocessor and a separate electronic memory to perform these and other functions.

The point-of-sale system 418 is the system that receives information from sensors 420 and the checkout registers 422 and processes this information. The point-of-sale system 418 processes received information (e.g., identifies a product and obtains a price) and performs other functions (e.g., interacts with the accounting system 410 via the processing device and/or server 416 to adjust inventory as needed based upon the transaction that is being processed). The point-of-sale system 418 also asks for and receives payment information from the customer. The point-of-sale system 418 operates in only the store 129. In some aspects, all other transactions are from the computer application 101 operated by the customer and that resides outside the store 129 (or other computer applications from other customers). The point-of-sale system 418 may be implemented by a processing device executing computer software, for example, by the processing device and/or server 416 or some other dedicated processing device.

The sensors 420 are any type of sensor such as a barcode reader, camera, or any other type of sensors that can scan information from a product that a customer is purchasing. The sensors 420 may be part of or incorporated with the checkout registers 422.

The checkout registers 422 are any checkout system used in a retail store and may include the relevant devices where product information of products being purchased by the customer order. These may include the physical facilities to place the products for scanning by the sensors 420 and a register operated by store employees for inputting purchase information from the customer.

The shipment system 424 is an electronic system that facilitates and makes product shipments, for example, to customers who made purchases using the computer application 101. The shipment system 424 may obtain shipping information (e.g., the address of the customer) and includes packaging equipment that appropriately packages for delivery to the customer. The shipment system 424 interacts with systems that physically pack shipment boxes, add shipping labels to the shipment boxes and perform other functions related to physically delivering a purchased item to a customer. The shipment system 424 may be implemented by a processing device executing computer software, for example, by the processing device and/or server 416 or some other dedicated processing device.

The robot 425 is any type of automated device that can perform different physical actions based upon commands it receives from the computer application. The robot 425 includes a processing device and electronic and/or hardware structures to receive and transmit information. The robot 425 may be deployed in a fixed location or may be able to move throughout the store 129. The robot 425 includes suitable arms, fingers, pinchers, grippers and/or other members to perform various tasks. For example, the robot 425 may move or rotate products or move merchandise within the store (e.g., move merchandise that is to be shipped from the shelves of the store 129 to a shipping department of the store where the shipping system 424 facilitates the shipment of the product to the customer). The robot 425 may also have other suitable electronic equipment. In one example, the robot 425 includes cameras or other sensors that enable the robot to obtain images requested by the customer. In another example, the robot is able to move the selected items to a trial (fitting) room for the customer to try on.

The robot 425 may be controlled by commands originating from the customer. In one example, the customer may desire to obtain images of the product in the store 129. The customer via the computer application 101 sends the commands to the store 129. The commands are received by the processing device and/or server 416. The processing device and/or server 416 routes the commands to the robot 425. The robot 425 executes the commands. For example, the robot 425 obtains images according to the commands. The images are sent by the robot to the processing device and/or server 416. The processing device and/or server 416 then forwards the images to the computer application 101. The images can then be displayed to the customer by the computer application 101. In another example, the commands cause the robot 425 to grab an item off a shelf in the store 129 and move, rotate, or otherwise adjust the position of the item within the shelf and/or at the store 129.

Other product database 426 may include information from databases that are not located at or controlled by the retail store. For example, the other product database 426 may be a third party database with product information (e.g., from the manufacturer). This information may be needed by various systems within the store 129. For example, the store 129 may retrieve this information as a result of an inquiry by a customer.

In one example of the operation of the system of FIG. 4, a customer is engaged with the computer application 101. The computer application 101 may be executed on an electronic device of the customer such as the smartphone of the customer.

The customer may engage in various interactions with the retail store 129. These interactions are accomplished by the exchange of information and electronic messages with the store 129 via the network 130.

For example, the customer may wish to purchase a product and cause the computer application 101 transmit a purchase instruction (e.g., purchase instruction 502 as described in FIG. 5) via the network 130 to the store 129. The purchase instruction may include the product description, price, product number, dimensions, color, and/or other information identify the product. It may also include payment information such as credit card information or bank account information allowing for the customer to purchase the product.

The purchase instruction is received at the processing device or server 416. Any translations or conversions are performed by the processing device or server 416. The processing device or server 416 determines that the message is a purchase instruction (e.g., by analyzing the content of the message) and proceeds to fulfil the order. The processing device or server 416 contacts the accounting system 410 so that the accounting system of the store 129 will be updated. The processing device or server 416 utilizes the credit card information to pay for the purchase, for example, by electronically contacting the bank holding the credit card. The processing device or server 416 also contacts the shipment system 424. The shipment system 424 handles the shipping of the product to the customer. For example, the shipment system 424 arranges that the product be removed from the shelves of the store (e.g., by instructing a store employee or instructing the robot 425), packaged, and shipped to the customer. The shipment system 424 may send update messages to the customer via the processing device or server 416. As mentioned, the shipment system 424 interacts with machines and systems that cause purchased items to be placed in shipping containers (e.g., boxes), have the boxes labeled, and delivered to a carrier (e.g., delivery service) to be delivered to the customer.

In other examples, the customer may wish to reserve a product in the store 129 for future purchase and cause the computer application 101 to transmit a reserve instruction (e.g., reserve instruction 504 as described in FIG. 5) via the network 130 to the store 129. The reserve instruction may include the product description, price, product number, dimensions, color, and/or other information reserve the product for purchase by the customer. If required to reserve the product, the reserve instruction may also include payment information such as credit card information or bank account information allowing for the customer to purchase the product. In still other examples, the reserve instruction will cause the robot 425 to remove the product from the shelves of the store 129. In aspects, the processing device and/or server 416 forms a command that will perform this operation.

The processing device or server 416 may store the identity of the item. The processing device or server 416 may have the item removed from the shelves of the store or tag the item (e.g., by sending a message to a store employee or instructing the robot 425 to perform these actions).

In still other examples, the customer may have an inquiry they wish answered by the store causing an electronic inquiry (e.g., inquiry 506 as described in FIG. 5) to be transmitted from the computer application 101 to the store 129 via the network 130. The inquiry an electronic message asking a question about a product the customer may wish to purchase. The store 129 may respond to the inquiry.

As mentioned, the processing device or server 416 can issue various commands to the robot 425. The commands or instructions may be the result of commands that the customer wants performed (e.g., move or photograph an item) or commands that are instituted by the processing device or server 416.

The instructions to a robot are electronic instructions to control the operation of robot. The robot 425, in examples, may be utilized by the customer to perform physical activities for the customer in the store. For example, the robot 425 may be electronically instructed to move merchandise from location-to-location, turn merchandise so that photos can be taken (e.g., from a camera in the store or on the robot) and sent to the customer to mention a few examples.

Figure 5:
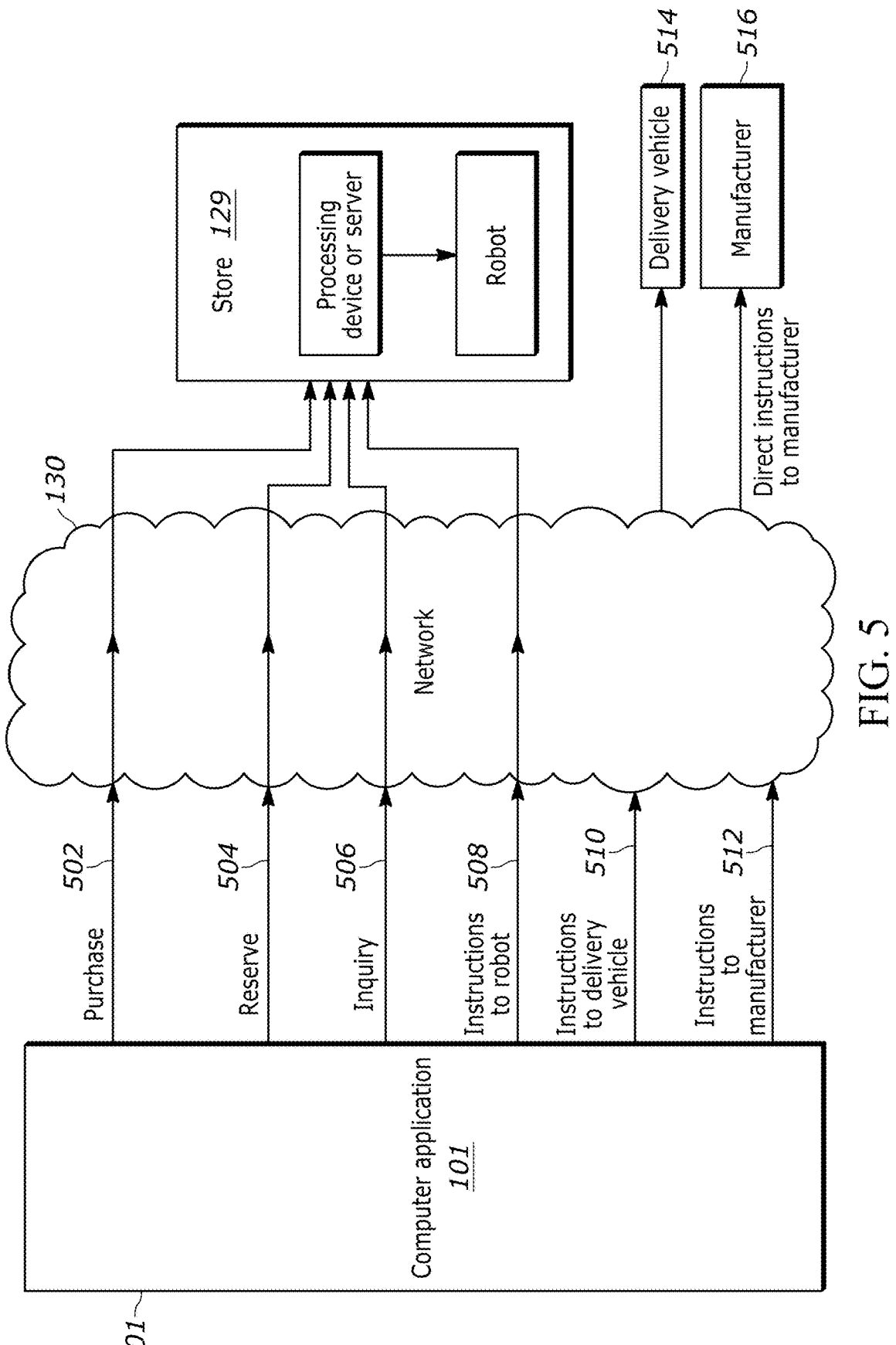
FIG. 5 comprises a diagram showing actions instigated by a computer application including actions involving a retail store according to various embodiments of the present invention.

Referring now to FIG. 5, one example of actions that may be taken utilizing the computer application 101 is described. The computer application 101 sends various electronic instructions via the network 130 to different destinations including the store 129, a delivery vehicle 514, and a manufacturer 516. Other destinations that are to receive electronic instructions are possible. Actions include sending a purchase instruction 502, a reserve instruction 504, an inquiry 506, instructions to a robot 508, instructions to a delivery vehicle 510, and/or instructions to a manufacturer 512.

The purchase instruction 502 is an electronic instruction to purchase a product sent by the computer application 101 to the store 129. It may include the product description, price, product number, dimensions, color, and/or other information identify the product. It may also include payment information such as credit card information or bank account information allowing for the customer to purchase the product.

The reserve instruction 504 is an electronic instruction to reserve a product sent by the computer application 101 to the store 129. It may include the product description, price, product number, dimensions, color, and/or other information reserve the product for purchase by the customer. If required to reserve the product, it may also include payment information such as credit card information or bank account information allowing for the customer to purchase the product.

The inquiry 506 is an electronic message sent by the computer application 101 to the store 129 asking a question about a product the customer may wish to purchase. The store 129 may respond to the inquiry. In one example, an employee of the store 129 may gather information and respond to the inquiry (e.g., by text, by calling the customer, or by sending the customer an email message). In other examples, the inquiry is automatically answered by the store 129. For example, an AI model may be deployed by the store 129. The AI model, in examples, is a neural network and is trained to answer customer questions. As with an employee, the AI model may answer the questions via different approaches such as via text message, making a phone call, or sending an email to mention a few examples.

The instructions to a robot 508 are electronic instructions to control the operation of robot 425. The robot 425, in examples, may be utilized by the customer to perform physical activities for the customer in the store. For example, the robot 425 may be electronically instructed to move merchandise from location-to-location, turn merchandise so that photos can be taken (e.g., from a camera in the store or on the robot 425) and sent to the customer to mention a few examples.

The instructions to a delivery vehicle 510 may be instructions to a delivery vehicle to perform an action. In one example, the electronic instructions control the operation of the delivery vehicle. In examples, the delivery vehicle is an automated vehicle and the electronic instructions control the operation of the automated vehicle such as causing the automated vehicle to start, stop, turn, or proceed to a specific delivery address. In other examples, the delivery vehicle is a motorized vehicle with a driver and the electronic instructions are sent to the driver.

The instructions to a manufacturer 512 are electronic instructions that cause actions to be performed at a facility of the manufacturer. For example, the electronic instructions may cause machines to operate and produce products. In aspects, these instructions cause machines at the manufacturer to be actuated, de-actuated, operate at a particular speed, or operate according to a particular schedule to mention a few examples.

Figure 6:
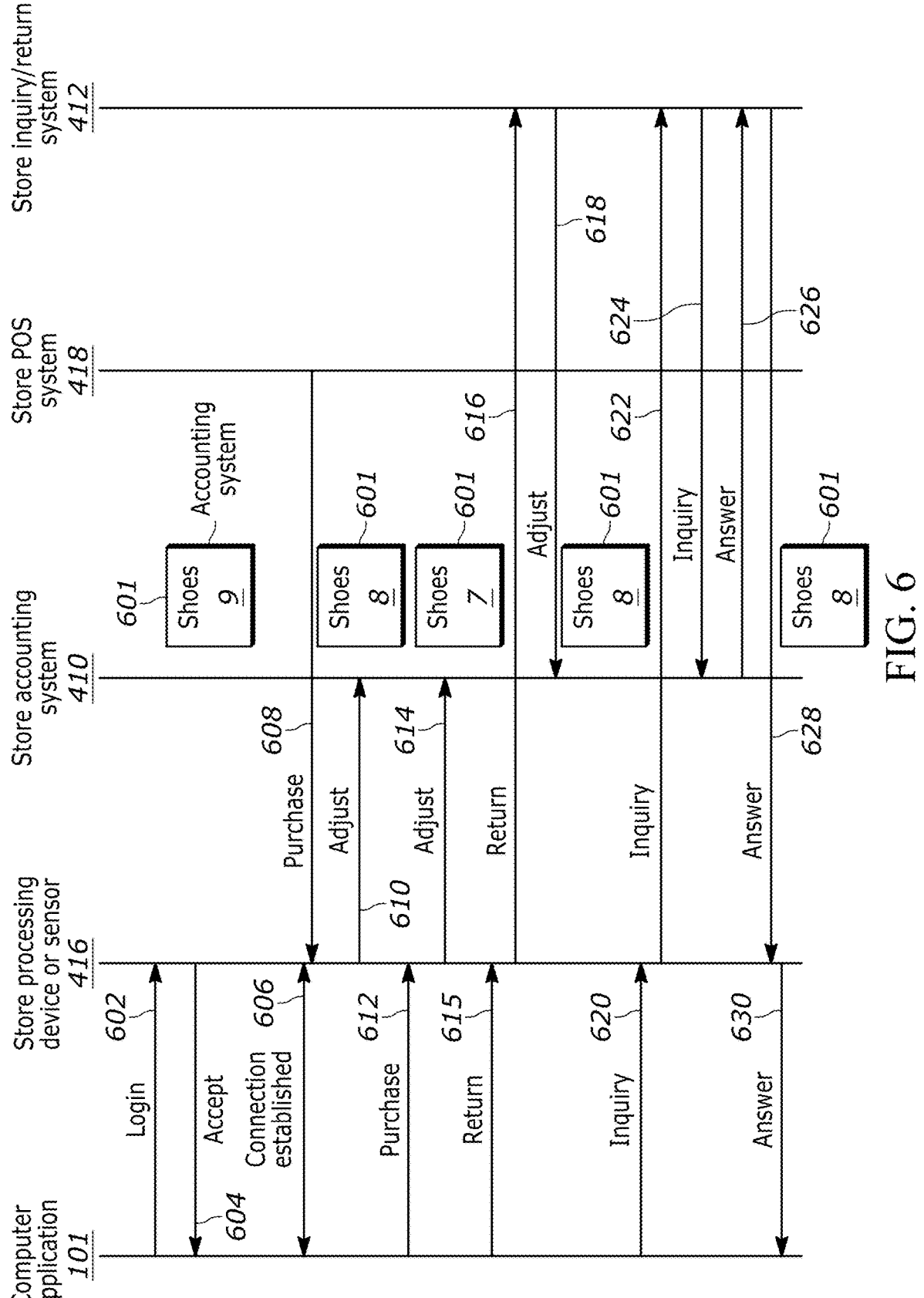
FIG. 6 comprises a call flow diagram of interactions between a computer application and a retail store according to various embodiments of the present invention.

Referring now to FIG. 6, one example of the interaction between various system elements is described. Specifically, the interaction between the computer application 101, processor device or server 416 (of the store 129), accounting system 410 (of the store 129), POS system 418 (of the store 129), and the inquiry/return system 412 is described in greater detail. In this example, the accounting system 410 maintains an inventory number 601 for shoes. This example shows how this inventory number changes over time as various events occur.

In the example of FIG. 6, an inventory number 601 is discussed. In examples, this is a perpetual inventory (PI) number. However, other types of inventory numbers or values may be used. The inventory number 601 can be used by the store 129 for various purposes. For example, the inventory number 601 may be used to automatically reorder products from a manufacturer, for example, when the inventory number 601 falls below a predetermined threshold. In other examples, the computer application 101 may track the inventory numbers in real time at multiple stores for products of interest. In these regards, the processor device or server 416 of each store may automatically send the inventory number of a customer selected product to the computer application 101 and the computer application 101 may alert the customer may alert the customer when this situation occurs. This number may be displayed on the display 105 and change in real time as the number changes. Also, inventory numbers of the same or different products from multiple stores may be rendered on the display 105 and change on the screen in real time as these numbers change at the stores. In this way, the customer may be alerted to purchase a desired product before the store runs out of that product.

At step 602, the computer application 101 sends a login request to the processor device or server 416 (of the store 129). The inventory number 601 shows that there 9 pairs of shoes present in the store 129. In examples, the customer may transmit security information such as a password with the login request.

At step 604, the processor device or server 416 (of the store 129) evaluates the login request including any security information and responds with transmitting an acceptance message to the computer application 101 if the security criteria (e.g., the required password) are met. The inventory number for the shoes has not changed.

At step 606, an electronic connection is established between the computer application 101 and the processor device or server 416 (of the store 129). In examples, the electronic connection is formed using the network 130. It will be appreciated that the example of FIG. 6 shows the establishment of a connection with a single store but that the same procedures shown in FIG. 6 can be used to establish connections with multiple stores.

At step 608, a customer makes a purchase of a single pair of shoes at the store 129 and as a result the POS system 418 (of the store 129) sends a message indicating the purchase of the product to the processor device or server 416 (of the store 129).

At step 610, an inventory adjustment message or request is sent from the processor device or server 416 (of the store 129) to the accounting system 410 (of the store 129). The inventory number 601 is adjusted to 8 pairs of shoes by the accounting system 410.

At step 612, the customer at the computer application 101 sends a purchase request for a product to the processor device or server 416 (of the store 129). The customer is purchasing a pair of shoes.

At step 614, the processor device or server 416 (of the store 129) sends an inventory adjustment message or request to the accounting system 410 (of the store 129). The inventory number 601 is adjusted to 7 pairs of shoes by the accounting system 410.

At step 615, the customer at the computer application 101 returns the same product and a return message is sent from the computer application 101 to the processor device or server 416 (of the store 129). The return message indicates or identifies the product being returned, the price paid, and how the customer desires to receive a refund (e.g., via a particular credit card) to mention a few examples.

At step 616, the return message (or information extracted from the return message) is sent from the processor device or server 416 (of the store 129) to the inquiry/return system 412 (of the store 129).

At step 618, an inventory adjustment message or request is sent from the inquiry/return system (of the store 129) to inquiry/return system 412. The inventory number 601 is adjusted to 8 pairs of shoes by the accounting system 410.

At step 620, an inquiry is made by the customer at the computer application 101 by sending an electronic inquiry to the processor device or server 416 (of the store 129).

At step 622, the inquiry (or information extracted from the inquiry) is sent from the processor device or server 416 (of the store 129) to the inquiry/return system 412.

In this example, the inquiry requires consulting with the accounting system 410. At step 624, an electronic inquiry is sent from the inquiry/return system 412 to the accounting system 410.

At step 626, an answer is sent from the accounting system to the inquiry/return system 412. For example, the customer may be inquiring about the number of shoes that are available at the store 129.

At step 628, the answer to the inquiry is sent from the inquiry/return system 412 to the processor device or server 416 (of the store 129).

At step 630, the answer is sent from the processor device or server 416 (of the store 129) to the computer application. The inventory number 601 shows 8 pairs of shoes.

It can be seen in this example that the computer application 101 has direct access to the accounting system 410. There is only one accounting number 601 for pairs of shoes at the store 129 and this is adjusted by both the computer application 101 and by activities occurring in the store 129. The computer application 101 thereby interacts with, accesses, and adjusts the same inventory number that systems within the store 129 interact. Put another way, there is not one inventory number for shoes that are sold within the store and a separate inventory number for shoes sold via the computer application 101.

Figure 7:
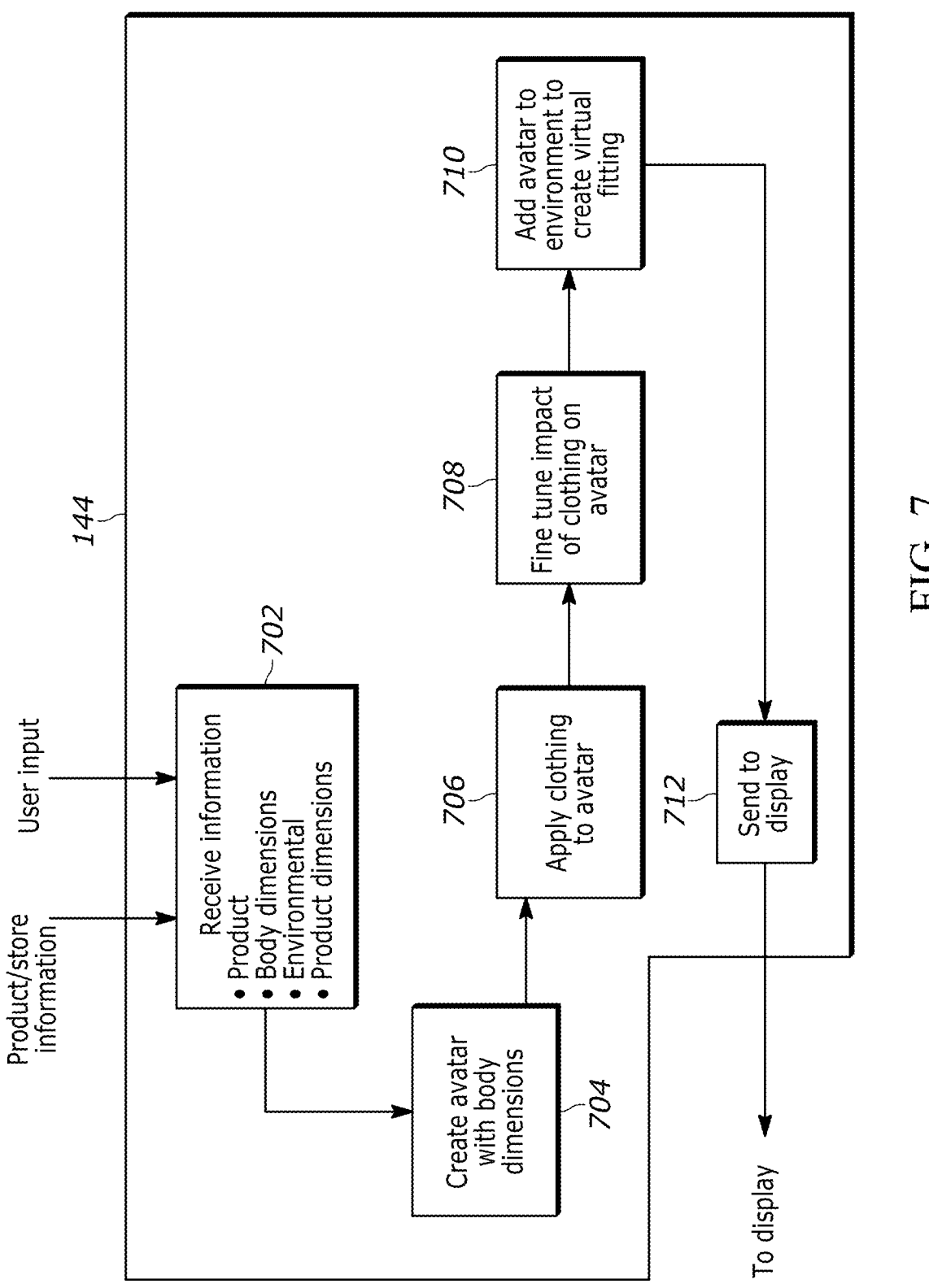
FIG. 7 comprises a block diagram of the virtual fitting module of FIG. 3 according to various embodiments of the present invention.

Referring now to FIG. 7, one example of a virtual fitting module 144 is described. In the virtual fitting module 144 described with respect to FIG. 7, an avatar is created for a particular customer and clothing selected by the customer is applied to the avatar. In this way, the customer can visualize what the clothing looks like on themselves without having to go into the store and try on the clothing. It will be appreciated that the virtual fitting module 144 may also create other displays such as furniture and artwork within the home of the customer to mention one example.

At step 702, information is received from various sources. For example, user input and product/store information may be received. The information may include details about a product (size, color, photos of the product, prices, sizes, etc.). Information can also be received from the user such as body dimensions of the users. These may be supplied in some cases by the user answering a questionnaire. The sizing information will help the application construction an avatar with the correct sizing for the individual customer using approaches that are known to those skilled in the art.

The information could also environmental conditions or context. In some aspects, the environmental conditions or context are an environment in which the avatar is to be displayed. For example, if the avatar of the customer is wearing swimwear, then the avatar may be pictured within a beach environment. The environmental conditions may be in the form of a photo. In the previous example, the environmental conditions may be the photo of a beach. In another example, the environmental conditions may be of the customer's home or rooms (or other spaces) within the home of the customer. Although photos may be used in other examples an image of the environment may be computer generated.

At step 704, an avatar with the body dimensions that have been supplied by the customer (or some other source) is electronically created. As mentioned, the avatar is an icon or figural representation of a specific person or other object that is rendered on the display 105. The avatar is a specific and realistic representation of a particular person scaled to the particular body dimensions of the person (height, arm length, etc.) and may include all particular facial features of the person. However, in other examples, the avatar may be any object or collection of objects (specific art works) and may also be an entire room or area. Other examples of avatars are possible.

It will also be appreciated that the avatar may represent the whole body of the customer. But in other aspects, the avatar may be a portion of the body since the head, upper body, lower body, arms, legs, or feet to mention a few examples.

At step 706, the clothing that is selected by the customer is applied to the avatar. This is accomplished electronically. The clothing is applied such that it interacts with an accounts for the body dimensions of the customer as reflected in the customer avatar. For example, if there is a bulge in the avatar, the clothing accounts for this bulge and is fitted over the avatar in consideration of the bulge.

At step 708, the clothing is further fine-tuned on the avatar. This may include adding further level of details. For example, shading, shadows, wrinkles, and other levels of detail may be added to the clothing. Details that relate to the environmental conditions in which the avatar will be displayed may also be added. For example, the brightness of the clothing may be adjusted upward if the clothing is to be displayed in a sunny environment or may be adjusted to a lower brightness level if the clothing is to be displayed in a darker environment. Other examples of fine-tuning are possible. In still other examples, the avatar may represent a piece of furniture and the customer may wish to see how the lighting conditions during the day affect the look of the furniture as the lighting conditions change.

At step 710, the environmental conditions or context specified in the environmental information are added to the display. For example, the avatar is positioned within the environment described in the information. To take the example described, the avatar of the person wearing the swimwear is positioned within background image showing a beach.

At step 712, the information is sent to a display. For example, the information is sent to the display 103 for rendering to the customer.

It will be appreciated that this is only one example of the virtual fitting module and relates to disclosing clothing on a customer. In other examples, furnishings may be displayed within the home of the customer. Other examples are possible.

Figure 8:
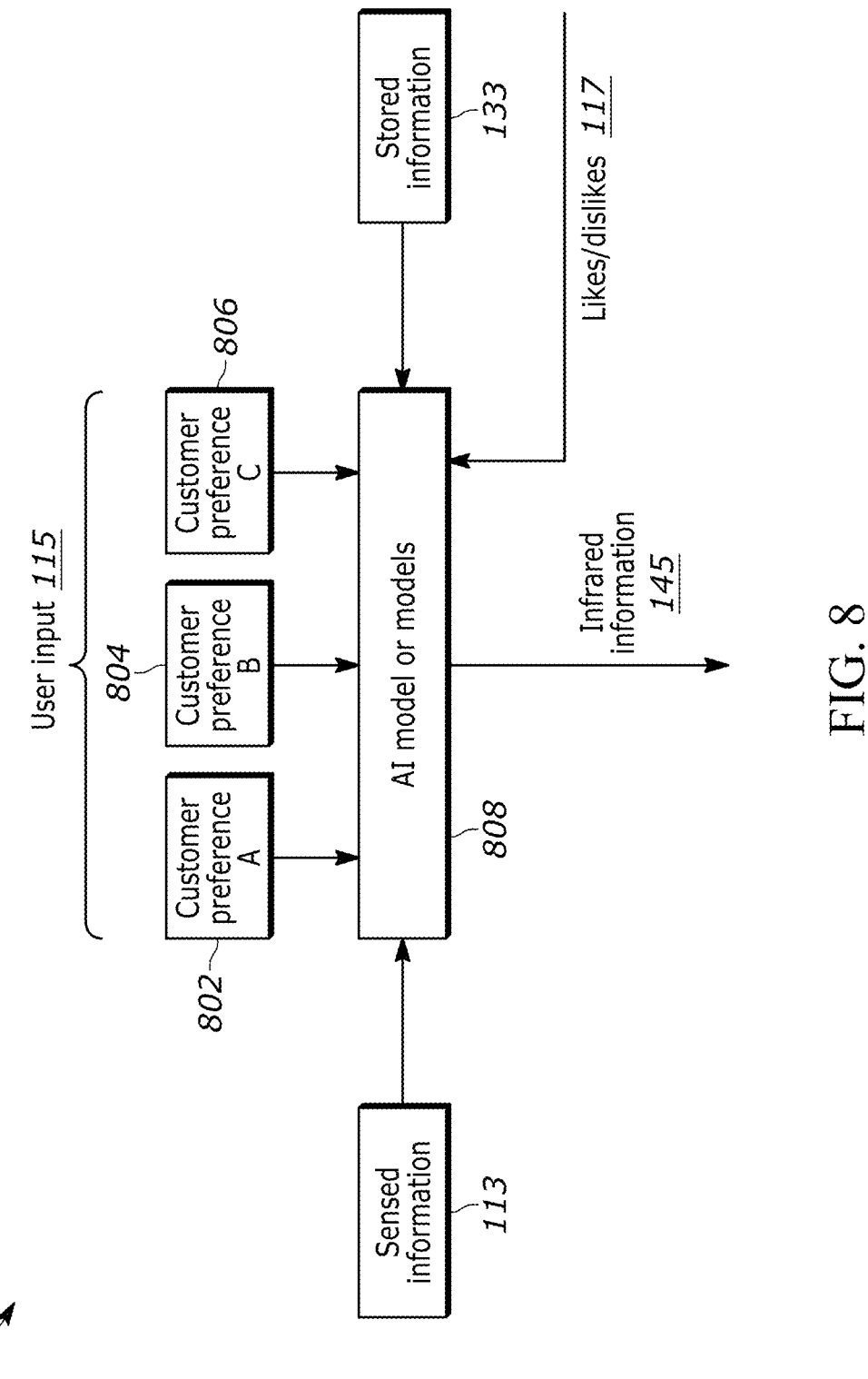
FIG. 8 comprises a block diagram of the model of FIG. 3 according to various embodiments of the present invention.

Referring now to FIG. 8, one example of a model 140 (of FIG. 3) is described. The model 140 receives user inputs 115. The user inputs 115 include a customer preference A (802) and customer preference B (804) and a customer preference C (806). An AI model (or models) 808 receives the customer preferences 802, 804, and 806, sensed information 113, stored information 133, and customer likes/dislikes 117.

The customer preferences 802, 804, and 806 include information provided by the customer from the user interface. In examples, the information may be entered as text, but in other examples it may be entered as voice data (where the user interface includes a microphone). The customer may be presented with questions ("What are your preferences?" or "What do you like to do?") or they may be more specific and enter exact preferences ("I like blue shirts."). This information can also include specific size information (e.g., waist size, arm length, or other body measurements) from the customer.

The sensed information 113 may include GPS sensor information (indicating the geographic location of a user from a sensor in their electronic device). The stored information 133 may include stored product information such as the dimensions, colors, price, availability or other information about a product that is stored in the memory 107. The customer likes/dislikes 117 information may include information from the customer indicating they extremely (or super) dislike a product, merely dislike a product, merely like a product, or extremely (super) like a product. This information indicates how much a customer favors a product or their feelings regarding a product. Other examples a numeric rating schedule (e.g., where a number of stars indicates how much a customer likes a product).

The AI model or model 808 may be any AI element or structure, or combination of AI elements or structures such a convolutional neural network (CNN). Such a neural network may include a number of connected layers, nodes, and weights. An input layer receives information. A filter pattern comprising a set of node-to-node weights is convolved with the input information thereby convolving it with all input node activations. The set of weights are applied to the corresponding input layer values and the weighted values summed to form an entry in a second layer. Areas in this second layer are likewise convolved with a different filter pattern specific to that layer and summed to obtain entries in a third layer. This continues up to fully connected layers. At fully connected layers, in contrast to the convolutional layers, all upstream nodes are fully connected to all downstream nodes and all have their own individual weights (as is known to those skilled in the art), so that a filter pattern of weights is not used at these layers. The results are the output of two or more fully connected layers.

In aspects, the neural network used for the AI model 808 is trained using a cost function. Once the neural network architecture (e.g., number of layers, nodes in each layer, interconnectivity) is established, weights between connected nodes are randomly initialized. Example data is input into the network, comparisons of the output of network to known results or values associated with the input example are made, and a cost using the cost function is determined, and the cost (error) is propagated backward in network, weights in the network at each layer are adjusted, and a test for convergence is performed. When sufficiently converged, the weights are frozen and the neural network can be used.

Different training data sets may be utilized. For example, the training data sets may include information about product preferences (e.g., color of products, type of products, style of products, composition of products to mention a few examples) and then an output determined (e.g., a customer preference). The output can be compared to known customer preferences from the training data and adjustments made for errors. To take one specific example, training data may include shoe color, material a shirt is made from, and style of pants. From this, inferences may be made as to the type of belt worn by the customer. This can be compared to known preferences of other customers to determine whether any adjustments need to be made to the structure of the AI model 808. As mentioned, the training data sets may include information about the customer, customers with similar demographic backgrounds to the current customer, all customers, and combinations of these. A particular mix of data sets with different data sources may also be used with predetermined weights (e.g., 70% data sets from the customer, 25% from similar customers, and 5% sourced from all customers) when this mixture is observed to produce the best results.

In some aspects, each customer has an associated AI model 808. For example, a first customer has a uniquely structured AI model, a second customer has a different and uniquely structured AI model, and a third customer has yet another, different and uniquely structured AI model. These models may be stored at each separate computer application for each different customer on their smart phone to mention one example. In other examples, the AI models are stored at a central location and are accessed by the computer application of each customer. The use of different AI model trained and stored at a central location (rather than each being local to a customer) in some cases may be more efficient and yield faster results than if a single and large AI model were used.

In yet other examples, multiple AI models are used and stored at a central location, but each model is not associated with a single customer. For example, a first AI model may be associated with customers residing in a first geographic area and a second AI model may be associated with customers residing in a second geographic area.

Referring now to FIG. 9, one example of the software filter 142 is described that shows further details of the software filter 142 that has been discussed earlier herein. In this example, the software filter 142 includes a first filter 902, a second filter 904, (optionally) a third filter 906, and a create informational streams module 908. The software filter 142 and its elements can be implemented as any combination of hardware/software and can also include or utilize an AI model (or multiple AI models) such as one or more neural networks. For example, the filters 902, 904, 906 may be implemented as computer software and/or AI models stored in the memory 107 and executed by the processing device 109. Specifically, the first filter may be a first neural network, the second filter a second neural network, and the third filter a third neural network. If neural networks are used, each of the filters are trained.

Each of the first filter 902, second filter 904, and third filter 906 are constructed, tuned, trained, and/or operated according to filtering criteria. Input data is applied to the filter 902, 904, 906 and the filtering criteria are applied to the input data to reduce the amount of input data and create output data. For example, a filter may have a criteria A, and when input data is applied to the filter only input data with characteristic A is output from the filter (in the form of the output data).

As discussed, when an AI model is used, a separate AI model may be used for each filter. Each of the AI models would then be trained using training data to operate and to produce the desired outputs. When computer software is used for the filter, the software may be created manually or automatically so that it receives inputs and produces the desired outputs from the inputs that are received.

User inputs 115 (e.g., user product preferences), sensed information 113 (e.g., GPS information indicating the location of the customer) is received by the filter 142. This is used by the processing device 109 to create the first filter 902 (or train the first filter 902 when the first filter 902 is a neural network or other AI structure). As mentioned, the first filter 902 may be constructed from computer software or, in some examples, be or include an AI model such as a neural network. The function of the first filter 902 is to receive information indicating a group of stores 910 received from a database of stores 916 and filter the stores to produce first filtered information 912. The first filtered information 912 represents the group of stores 910 that has been reduced or filtered according to the first filter 902. The database of stores 916 includes information listing or describing a large group of potential stores that could be of interest to the customer. It will be appreciated that the first filter 902 may be constructed to perform its filtering function using or according to one or both of the user inputs 115 and/or sensed information 113.

The second filter 904 is created and performs its filtering function based upon the inferred information 145. In aspects and in these regards, the inferred information 145 is used to construct the second filter 904 (or train the second filter 904 when the second filter 904 is a neural network or other AI structure). The function of the second filter 904 is to receive the filtered information 912 that is received from the first filter 902 and filter the first filtered information 912 into second filtered information 914. The second filter 904 may be constructed from computer software or, in some examples, be or include an AI model such as a neural network. In one example, the inferred information 145 may indicate that the customer should like black belts, so the second filter 906 filters the first filtered information 912 to select stores that sell black belts.

The third filter 906 is optionally created and when created performs its filtering function based upon user likes and dislikes 117 (e.g., this may include super dislikes, normal dislikes, normal likes and super likes). For example, if user likes and dislikes 117 indicates the customer super dislikes stores in strip malls, then the third filter 906 takes the second filtered information (which in this example is a group of stores) and selects stores that are not in strip malls. The list of stores as filtered by the third filter 906 is passed to the create informational streams module 908. The likes and dislikes 117 may be used to train the third filter 906 when the third filter 906 is a neural network or other AI model.

It will be appreciated that the location of the optional third filter 906 may be moved into different locations in the example of FIG. 9. For example, the location of the third filter 906 may be exchanged or swapped with the location of the first filter 902 or the second filter 904. In this way, user likes and dislike 117 are used as the first filtering criteria. Any of the filters 902, 904, and 906 may be moved and arranged in any combination into various positions in the electronic architecture of FIG. 9.

For any of the filters 902, 904, and 906, the input information to that filter may be data in the form of electronic records (or other electronic structures) that includes tags or other identifiers that allows the filters 902, 904, 906 to quickly evaluate the information in the electronic record. For example, any input data to any filter 902, 904, 906 may include a list or grouping of electronic records with each record representing a store. Each record may include one or more tags, for example, a tag identifying the geographic location of the store. Consequently, the filter (in some aspects, constructed from software) may examine the tag indicating the location of the store to see if it matches (or is within a certain range) of the geographic information (supplied by the sensed information 113) used as the filtering criteria of the first filter 902.

In other examples and as mentioned, the filter is an AI model (or combination of computer software and AI model). In aspects, the input data to the filter are records and the AI model and/or computer software examines, analyzes, and/or processes the data to determine whether the filtering criteria are met. For example, if the filtering criteria are that the store is in a specific geographic location and the store sells a certain brand of clothing then the record is analyzed to determine whether the record matches these criteria (and if it does, this record becomes part of the first filtered data 912.

In other aspects, the first filter 902, second filter 904, and third filter 906 include functionality (hardware, software, and/or AI model) that can perform further investigations of a store identified in the store data 910. For example, a particular store may be indicated in the store data 910. The first filter 902 may identify this store and then automatically connect with the internet and access a website of the store or a social media account of the store. This information (e.g., the website or social media information) may be further examined and further information extracted or determined. In one example, these locations may be examined to obtain the store location (by finding a store address) or identity of products carried by the store (by examining a catalog carried on the website). This information can be included in the informational streams 123.

Weighting of different criteria can be used by any of the filters 902, 904, 906. For example, when the inferred information is multiple pieces of information then this information used to construct the filter using different weights of importance. For example, the inferred information may indicate that the customer should like black belts that cost more than $100. However, the inferred information concerning black belts may be deemed to be of much greater importance than the pricing information such that the black belt criteria is deemed of much higher importance such that the pricing information can be negated or ignored. In these regards, a single filter could be used (in place of the three filters 902, 904, 906) and each of these having criteria that are weighted in importance.

The create informational streams module 908 creates the informational streams 123. It receives the second filtered information 914 (or, when the option third filter 906 is used, the output of the third filter) to form these streams of information. The create informational streams module 908 constructs the streams. The informational streams 123 include images, text, and/or hyperlinks to use a few examples. The create informational streams module 908 may obtain additional information about a store or rearrange information to include in one of the informational streams 123. The create informational streams module 908 may also look for suitable products from the stores and display these in the informational streams 123. The create informational streams module 908 may display a list of stores and present these with or in place of the streams 123. The create informational streams module 908 may also further filter the informational streams 123 so that only the top streams likely to be of most interest to the customer will be presented to the customers (e.g., only the top three streams or streams with stores at the geographical location where the customer is presently located are displayed).

The informational streams 123 may also include advertising information. For instance, there may be one stream-per-store and electronic coupons may be incorporated in the stream. The coupons may automatically change on the display 105, for example, as the customer changes location (e.g., comes closer to the store or enters the store).

Figure 10:
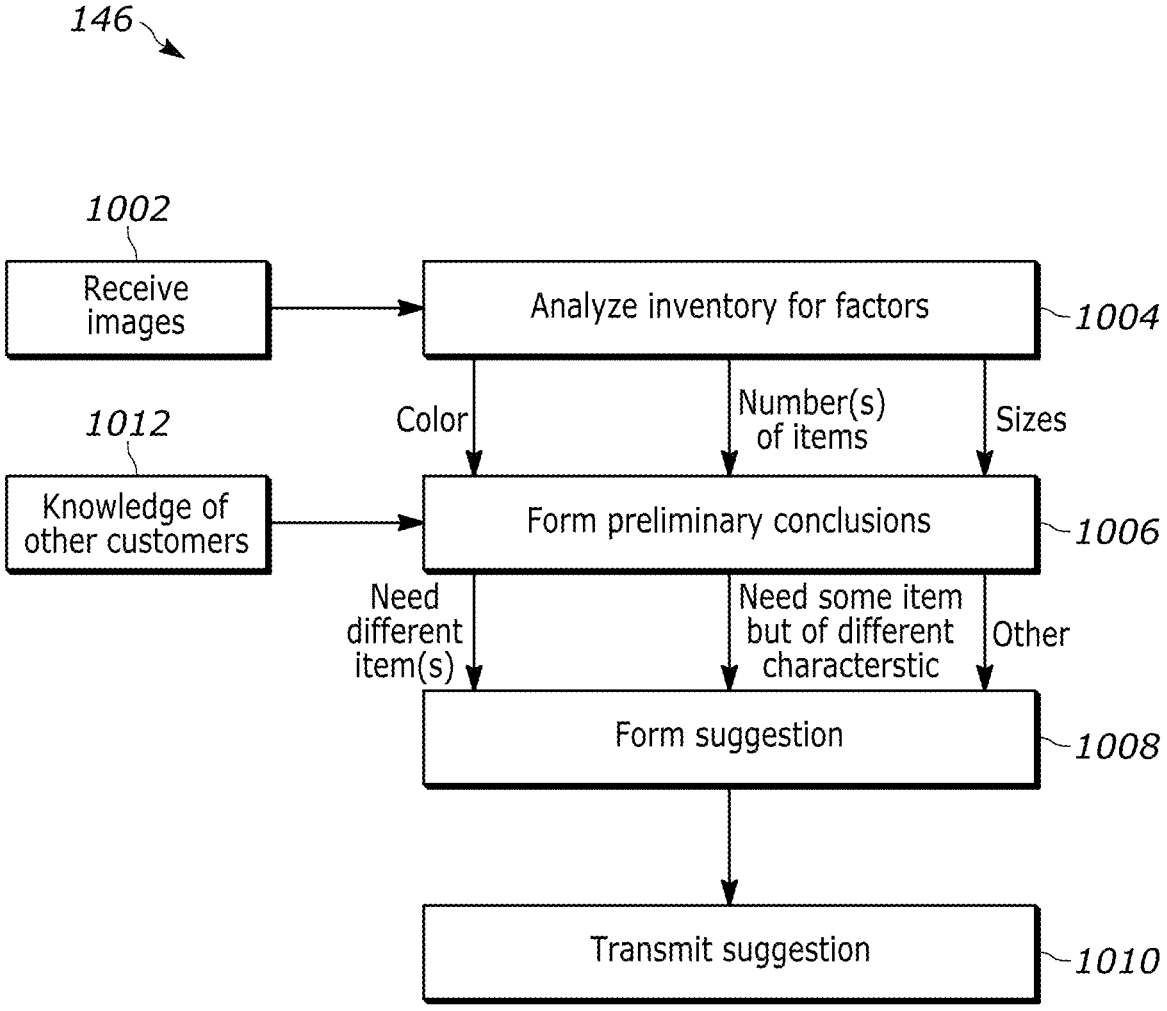
FIG. 10 comprises a block diagram of the inventory suggestion module of FIG. 3 according to various embodiments of the present invention.

Referring now to FIG. 10, one example of the inventory suggestion module 146 is described. In this example, a photo, photos, or other types of images may be taken of the clothing inventory of the customer, for example, of the clothing present in the closet of the customer or in the drawers of chests where the customer stores their clothing.

At step 1002, images are received from sensors (e.g., sensed information 113 from the sensor 111). In examples, the sensors may be cameras or scanners. Other examples of sensors are possible.

At step 1004, the images are analyzed for different factors or characteristics. Any image analysis approach known to those skilled in the art may be utilized. For example, the image may be examined by appropriate image analysis software that determines articles of clothing in the image. For example, the pixel content of the image may be examined to determine texture and whether the texture corresponds to articles of clothing. In aspects, the texture of clothing is different than the texture of, for example, wood and this difference can be ascertained in the analysis and the objects of clothing determined. In other aspects, the numbers, colors, sizes, or other characteristics of a customer's wardrobe are determined and are utilized subsequently to form conclusions.

At step 1006, preliminary conclusions may be formed. This step may use knowledge from other customers 1012, which may rely on what other customers found useful. For example, if the customer is determined to have pants and shirts and no belts are present then the preliminary conclusion may be to suggest that a customer purchase a belt. In another example, the preliminary conclusion may be to suggest that the customer purchase a shirt of a certain color because that color is missing from the customer's wardrobe and other customers have been purchasing shirts having that color (i.e., the color of shirt is popular).

The inventory suggestion module 146 can also ask for feedback or information, for example, from the customer. For instance, the inventory suggestion module 146 may ask the customer to supply other images based upon analysis of previous images. In addition, the customer may supply an image of their closet but some of the items of the closet may be hidden or partially hidden causing the inventory suggestion module 146 to ask the customer to provide additional images of the hidden items or area.

The inventory suggestion module 146 may ask follow-up questions to the users that are automatically generated based upon analysis of images provided by the customer. For example, when the analysis made by the inventory suggestion module 146 indicates the customer has no belts then the inventory suggestion module 146 may form a question presented on the display 105 asking the customer if they have belts, how many, of what color, and/or requesting other information.

At step 1008, a suggestion may be created or formed. The preliminary conclusion may be finalized and a final suggestion formed.

In these regards, the inventory suggestion module 146 may obtain additional information, analyze this information, and present this information for the consideration of the customer along with any suggestions. For example, if the inventory suggestion module 146 determines it will suggest to the customer that the customer purchase a brown belt, the inventory suggestion module 146 may automatically establish an internet connection, search websites for brown belts, determine if the candidate belts would fit with what the inventory suggestion module 146 knows about the customer, and provide hyperlinks and other information about the brown belts that were found to the customer along with the suggestion to purchase a brown belt. The suggestion and any of this additional information may be put into an appropriate format such as an audio, visual, and/or text message or email to the customer.

At step 1012, the suggestion is transmitted to the display information module 110 to be displayed to the customer on the display 105.

The inventory suggestion module 146 may develop suggestions as to more than making a product recommendation. For example, analysis by the inventory suggestion module 146 may suggest the customer should organize, store, or display their collection in different ways. In other examples, the analysis by the inventory suggestion module 146 may determine that condition issues exist with items in a customer inventory. For example, analysis may indicate that clothing is worn and may need to be replaced.

It will be appreciated that the inventory suggestion module 146 may be implemented using an AI model such as a neural network. In this case, one model may be stored locally at the electronic device of each customer. Each model may be unique and trained with specific data of the purchase history, preferences, and likes/dislikes of a specific customer. Each model may also be trained with market data including the preferences of other users, fashion trends, and the purchase and/or feedback of other customers to mention a few examples. In other examples and when the module is looking for product defects, the model may be trained with examples of product defects such as worn clothing in order to check for these defects.

Figure 11:
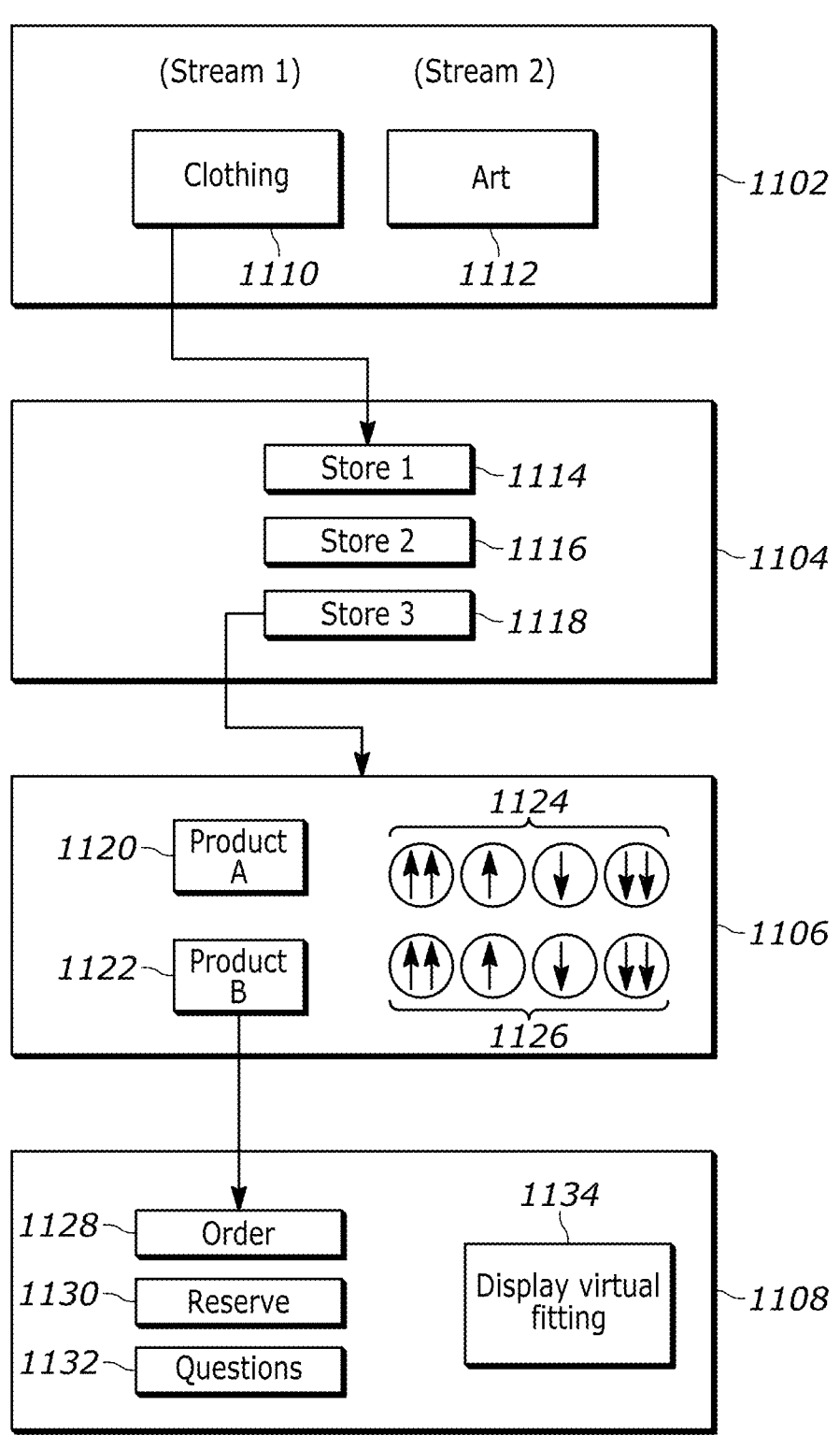
FIG. 11 comprises a diagram showing examples of display screens and more specifically a sequence of screens being displayed according to various embodiments of the present invention.

Referring now to FIG. 11, one example of a sequence of screens that may be displayed to a customer is described. The screens include a first screen 1102, a second screen 1104, a third screen 1106, and a fourth screen 1108. It will be appreciated that the screens 1102, 1104, 1106, and 1108 are displayed sequentially, one-after-the-other. That is, the first screen 1102 is displayed, the customer interacts with the screen 1102 causing the second screen 1104 to be displayed. The customer interacts with the second screen 1104 causing the third screen 1106 to be displayed. The customer then interacts with the third screen 1106 causing the fourth screen 1108 to be displayed.

The screens 1102, 1104, 1106, and 1108 may have or incorporate reverse (backward) arrows and forward icons (e.g., arrows) as are typically found on computer screens allowing a user to navigate between the different screens 1102, 1104, 1106, and 1108. For example, a user may be on the screen 1108 and may navigate back to the screen 1106 using a reverse arrow, which in some examples is displayed at the corner of the screen 1108. Once on the screen 1106, the user may return to the screen 1108 by pressing or otherwise selecting a forward arrow, for example, positioned in an upper corner of the screen 1106.

It will be appreciated that the examples shown in FIG. 11 represent some of the types of information and one sequence of screens that can be displayed. Other examples of screens that can be displayed and different sequences of displaying the screens are possible.

The first screen 1102 includes a first informational stream 1110 and a second informational stream 1112. In this example, the first stream 1110 is a clothing informational stream that features clothing items of potential interest to the customer and/or stores that sell the clothing, or both. The second informational stream 1112 is an art stream and may include items of art that may be of interest to the customer, stores or auction platforms that sell the art, or both.

The first informational stream 1110 may feature, include, or incorporate hyperlinks that can be selected by the customer. In one example, the first informational stream 1110 may include images of items of interest and an icon representing stores where the item or items of interest may be found. Selecting an icon or a hyperlink causes the screen to change and information concerning or associated with the icon or hyperlink to be displayed.

The second informational stream 1112 may also feature hyperlinks that can be selected by the customer. In one example, the second informational stream 1112 may include photos of artwork that may be of interest to the customer and an icon representing stores or auction platforms where the item or items of interest may be found. Selecting an icon or a hyperlink causes the screen to change and information concerning or associated with the icon or hyperlink to be displayed.

In the example of FIG. 11, the customer selects an icon in the first informational stream 1110 representing stores where clothing items may be found. This selection causes the second screen 1104 to be displayed.

The second screen 1104 includes images that may include hyperlinks of stores that may be of interest. In this case, a first icon representing a first store 1114, a second icon representing a second store 1116, and a third icon representing a third store 1118 are displayed on the screen 1104.

The third screen 1106 includes an indicator for product A 1120, an indicator for product B 1122, like/dislike indicators (for product A) 1124, and like/dislike indicators (for product B) 1124.

The indicator for product A 1120 may indicate the product (e.g., a shirt). It may include a photo or photos of the product and may include dimensions, sizes, colors, and other information.

The indicator for product B 1122 may indicate a different product (e.g., a different shirt or pants). It may include a photo or photos of the product and may include dimensions, sizes, colors, and other information.

The like/dislike indicators (for product A) 1124 are a group of arrow icons that allow a customer to rate product A. Two upward arrows indicates the customer intensely or greatly likes product A. One upward arrow indicates that the customer merely likes product A. One downward arrow indicates that the customer merely dislikes product A. Two downward arrows indicate that the customer greatly or intensely dislikes product A. This information can be used as described elsewhere herein to fine-tune various processes. The customer selects, clicks, or presses an icon (e.g., using a computer mouse or, if a touch screen is being used, pressing the icon on the screen).

The like/dislike indicators (for product B) 1126 are a group of arrow icons that allow a customer to rate product B. Two upward arrows indicates the customer intensely or greatly likes product B. One upward arrow indicates that the customer merely likes product B. One downward arrow indicates that the customer merely dislikes product B. Two downward arrows indicate that the customer greatly or intensely dislikes product B. This information can be used as described elsewhere herein to fine-tune various processes.

The user selects an icon 1120 or 1122 and this cause the fourth screen 1108 to be displayed. The fourth screen 1108 includes an order icon 1128, a reserve the item icon 1130, and a questions icon 1132.

The order icon 1128 allows a customer to order product B. Another screen will be displayed allowing the customer to verify the order and enter credit card information.

The reserve the item icon 1130 allows the customer to reserve product B in the store. Another screen will be displayed allowing the customer to verify the order and enter credit card information to hold the item.

The questions icon 1132 allows the customer to ask questions about any item. Another screen will be displayed allowing the customer to type in a message to the store. In other aspects, a direct connection or communication link to the store may be established allowing the customer to speak the question to a store employee and verbally receive an answer.

There may be an icon 1134 that allows the user to display an avatar representing the customer with the selected item of clothing being displayed on the avatar. For example, when the customer has selected a shirt of a specific size, color, or style, selecting the icon 1134 causes the shirt to be realistically presented on the avatar.

The screens can arrange and present information in a number of different ways. For example, when displaying lists of stores, the stores may be ranked according to different criteria such as distance to the stores and reviews by other customers. The screens can display other information of interest to the customer such as weather information or travel information. The screens can vary based upon where the customer is located. The screen or portions of the screen can also dynamically change. For example, as the customer moves from location-to-location the stores presented in the informational feeds may change based upon the location of the customer (e.g., as sensed by a GPS sensor). In this case, the nearest stores to the customer may be displayed to the customer as the customer walks through a central business district, with the stores selected to be displayed also based upon the other criteria discussed herein. In other examples, as the criteria change, the list of stores and/or products displayable on the informational feeds also changes. For example, the customers may like or dislike stores, make purchases, or perform other actions, the list of stores and/or products displayable on the informational feeds also changes.

The screens may have selections available to the customer that facilitate the tracking of products. For example, the customer may indicate via interactions with the screen whether the customer wishes to track purchases of a product made by other customers at a particular store. The inventory of such products may also be displayed in real time so that the customer can determine when a store is running low on a product.

Figure 12:
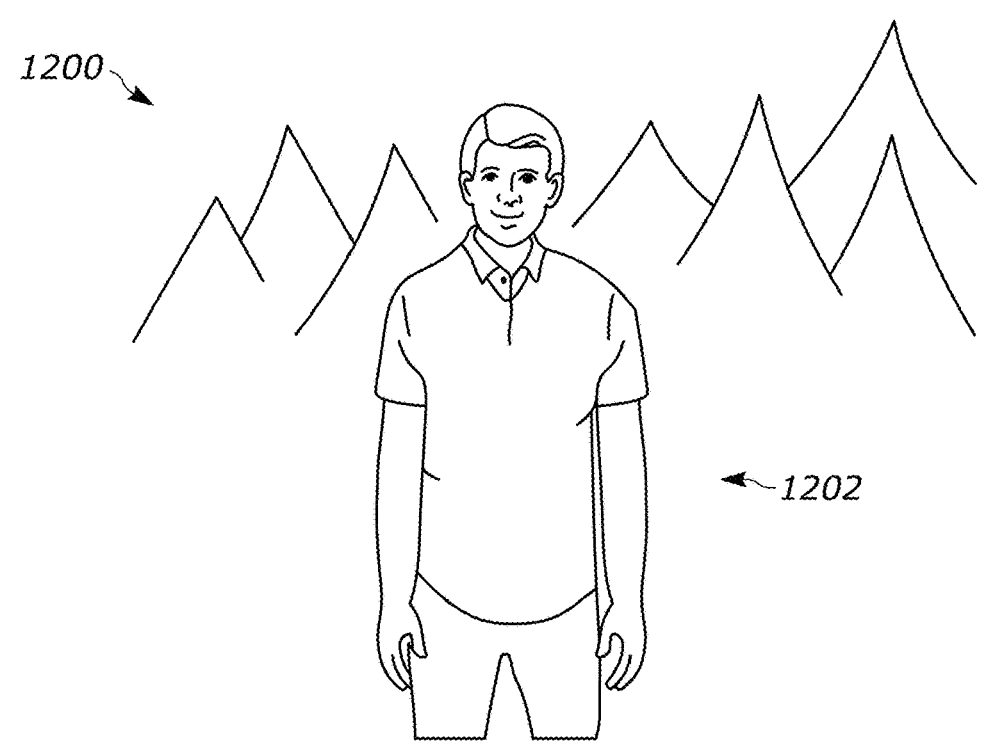
FIG. 12 comprises a diagram showing one example of an avatar displayed in an environment according to various embodiments of the present invention.
Figure 12:
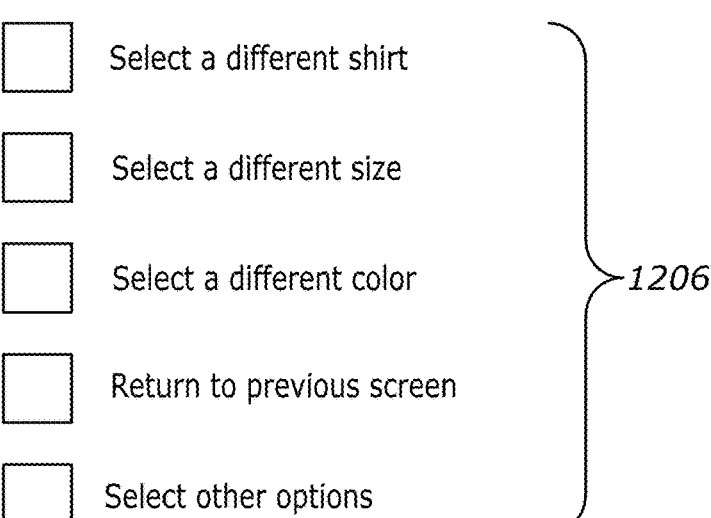

Referring now to FIG. 12, one example of a screen 1200 showing an avatar 1202 is described. The avatar 1202 is an avatar of the customer sized according to the customer's dimensions and sizing. In this case, the customer is determining whether they wish to purchase a shirt, which is being displayed on the avatar 1202. It will be appreciated that this is one example of an avatar (and one item of clothing) and one example of how an avatar may be displayed. Other examples of avatars with other items of clothing are possible. The avatar 1202 may be constructed, controlled, and displayed using any appropriate computer software as known to those skilled in the art.

A message 1204 from the store may also be displayed on the screen 1200. The message 1204 includes a variety of further options for the customer. In this case, the options include selecting a different shirt (for display on the avatar 1202), a different size of the shirt (for display on the avatar

1202), selecting a different color of short (for display on the avatar 1202), returning to the previous screen, or selecting different options. The screen 1200 may also include back-arrows and forward arrows allowing the customer to navigate between previous screens and the current screen.

An environmental context or setting 1208 (in this case, an outdoor scene with mountains) is also displayed with the avatar 1202 on the screen 1200. In this way, the customer can picture themselves with the clothing in a preferred environment thereby enabling the customer to make an easier decision as to whether to purchase the clothing. Other items may also be present in the environment 1208. For example, chairs or stools may be present in the environment. As discussed elsewhere herein, the avatar 1202 may interact with these items. In another example, the avatar 1202 may be caused to sit down in a chair that is part of the environmental context or setting 1208.

Other environmental conditions can also be accounted for in the display involving the avatar 1202. For example, when the avatar 1202 is displayed in an outdoor setting, the lighting conditions can be considered and incorporated in the display. If the day is sunny, then the clothing may be displayed as being brighter compared to whether the day is cloudy. Precipitation can also be shown to fall on the avatar and affect the clothing being worn by the avatar 1202. For instance, rain or snow may fall on the avatar 1202 and the clothing be displayed on the avatar 1202.

It will be understood that the avatar 1202 may be controlled by various types of user interactions. In some examples, the avatar may be animated. That is, the avatar may move in life-like motions. For example, the avatar 1202 may be caused to move across the screen and through the environment. The avatar 1202 may be caused to bend, stretch their arms, or flex their legs to mention only a few examples. These motions may be taken to allow the customer to get a better understanding and/or look at the clothes they may be purchasing. Various other types of interactions with things in the environment are also possible. For example, the avatar 1202 may walk up to a bench or chair in the environment and sit down. In still other examples, the avatar may remove an item of clothing, for example, remove a shoe that the avatar is wearing. The customer may zoom in on the shoe (or any other part of the avatar) to get a better look at the item.

In other aspects, the clothing or other items being worn by the avatar and presented on the screen 1200 may be flagged or tagged. The purpose of the flags or tags is to present or store further information about the product. The flags or tags may be presented on the screen 1200 and visually attached to the product. In other examples, the tags or flags are normally "invisible" or not presented but may be made visible by the customer taking some sort of action such as selecting, touching, or clicking on the product. In some examples, the information in the tags or flags may be entered by the store while in other examples the information may be entered by the customer.

To take one example, a price tag may be associated with the clothing being worn by the avatar. The customer may click on a portion of the avatar 1202 to show the price of the clothing. Clicking on the avatar 1202 may also display other types of pricing information such as any discounts being offered by the retail store. Clicking on the price information may serve as a short-cut into the customer ordering the clothing being worn by the avatar 1202. For example, this may cause the display of an ordering screen as described above.

In still other examples, multiple avatars of the same customer or multiple avatars showing different customers wearing the same or different clothing may be displayed on the screen 1202. In this way and in one example, the customer can picture different items being worn and compare different clothing items and make their purchasing decision easier.

In yet other examples, the avatars may interact with each other. For example, a first avatar may be caused to walk up to a second avatar and touch, stretch, or pull the clothing of the first avatar.

The customer may control avatar movement in a number of different ways. For example, voice commands may be issued by the customer (and received by a microphone on the user electronic device) that instruct avatars to move and perform specific acts within the environmental context 1208. In other examples and when a touch screen is being used a customer can touch and move an avatar causing the avatar to be moved by the movement of the customer's finger across the screen. For example, the customer may wish to turn the avatar to see the clothing being worn by the avatar at different angles and from different positions. These actions can be caused to be performed by utilizing various types of software such as voice recognition software and software that recognizes the customer's touch on a particular part of the screen 1200, determines the intent of the customer, and implements the action.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A method for the secure and streamlined selection, provision, and movement of items through multiple retail stores to customers, comprising:

operating a computer application on a mobile electronic device, the mobile electronics device having a display;

receiving user input from a customer at the computer application, the user input including product interests of the customer;

inferring additional information from the user input utilizing an artificial intelligence (AI) model, the inferred additional information including inferred information regarding additional products of interest to the customer and stores of interest to the customer;

creating a software filter according to the user input and the inferred additional products of interest and stores of interest;

actuating the software filter to produce a plurality of informational feeds, the plurality of informational feeds including potential retail stores of interest to the customer, each potential retail store having a unique inventory and an independent electronic accounting system where the unique inventory is stored, wherein the software filter is dynamically adjusted according to customer preferences and the inferred additional information;

rendering each of the plurality of informational feeds on the display to the customer;

receiving a store selection from the customer, the store selection indicating a first store of interest and a second store of interest presented in the informational feeds;

operating a first shipping system at the first retail store of interest that ships products to customers and a robot at least in part moves products to the shipping system;

operating a first point-of sale system at the first retail store of interest that processes transactions with customers at the first retail store;

for the first store of interest indicated by the customer in the store selection, electronically and independently connecting the computer application to a first electronic accounting system of the first store of interest, the first electronic accounting system of the first store of interest being adjusted in real-time by events occurring at only the of the first store of interest, inventory-related contents of the first electronic accounting system of the first store of interest also being visible, accessible, and adjustable by the computer application in real time, non-inventory-related contents of the first electronic accounting system of the first store of interest being non-accessible by the computer application;

for the second store of interest indicated by the customer in the store selection, electronically and independently connecting the computer application to a second electronic accounting system of the second store of interest, the second electronic accounting system of the second store of interest being adjusted in real-time by events occurring only at the of the second store of interest, inventory-related contents of the second electronic accounting system of the second store of interest also being visible, accessible, and adjustable by the computer application in real time, non-inventory-related contents of the second electronic accounting system of the second store of interest being non-accessible by the computer application;

at the computer application, receiving a product selection from the customer of a first item-of-interest from the first store of interest, and causing actions to be performed, the actions being:

producing and rendering a virtual fitting of the selected first item-of-interest or the second item-of-interest on the display, wherein the virtual fitting shows the selected first item-of-interest or the selected second item-of-interest within a specific environmental context and wherein brightness levels of the selected first item-of-interest or the selected second item-of-interest are adjusted based upon the specific environmental context;

transmitting first electronic commands from the computer application to the first retail store to cause the robot to grasp and move an item at the first store of interest;

transmitting second electronic commands from the computer application to the first retail store to cause a camera at the robot to obtain an image of the item at the first store of interest; and transmitting electronic purchase instructions for the selected first item-of-interest to the first retail store;

wherein the first electronic commands and the second electronic commands are processed by a first processing device at the first retail store;

wherein the processing of the first commands and second commands by the first processing device, the processing of shipments by a second processing device of the shipping system; and the processing of sales transactions by a third processing device of the point-of sales device occur in parallel to enhance efficiency of operation.

2. The method of claim 1, wherein the virtual fitting includes an avatar of the customer or parts of the customer and the selected item-of-interest is virtually displayed on the avatar based on sizing questions concerning body measurements answered by the customer and dimensions or characteristics of the selected item-of-interest.

3. The method of claim 2, wherein the avatar is displayed with clothing selected by the customer.

4. The method of claim 1, wherein the plurality of informational feeds include fashion feeds, art feeds, furniture feeds and/or home goods feeds.

5. The method of claim 1, wherein the AI model is trained prior to usage.

6. The method of claim 1, wherein the computer application is configured to access databases for each potential retail store of interest selected by the customer.

7. The method of claim 1, further comprising, by the computer application, receiving customer likes and dislikes of the first item-of-interest and the second item-of-interest.

8. The method of claim 1, wherein sensed information is received of an inventory of the customer and the model are adjusted according to the sensed information.

9. A system for the secure and streamlined selection, provision, and movement of items through multiple retail stores to customers, comprising:

an electronic processing device;

a display coupled to the electronic processing device;

a memory coupled to the electronic processing device;

a user interface coupled to the electronic processing device;

a computer application that is stored in the memory and executed by the electronic processing device;

wherein the electronic processing device is configured to receive user input from a customer via the user interface upon execution of the computer application, the user input including product interests of the customer;

wherein the computer application when executed by the processing device is further configured to:

utilize an artificial intelligence (AI) model to infer additional information about the customer from the user input, the inferred additional information including inferred information regarding additional products of interest to the customer and stores of interest to the customer;

create a software filter according to the user input and the inferred additional products of interest and the stores of interest;

actuate the software filter to produce a plurality of informational feeds, the plurality of informational feeds including potential retail stores of interest to the customer, each potential retail store having a unique inventory and an independent electronic accounting system where the unique inventory is stored, wherein the software filter is dynamically adjusted according to customer preferences and the inferred additional information;

render each of the plurality of informational feeds on the display to the customer;

receive a store selection from the customer via the user interface, the store selection indicating a first store of interest and a second store of interest presented in the informational feeds on the display;

wherein a first shipping system is operated at the first retail store of interest that ships products to customers and a robot at least in part moves products to the shipping system;

wherein a first point-of sale system is operated at the first retail store of interest that processes transactions with customers at the first retail store;

wherein the computer application is further configured to, for the first store of interest indicated by the customer in the store selection, electronically and independently form an electronic connection to a first electronic accounting system of the first store of interest, the first electronic accounting system being adjusted in real-time by events occurring at the first store of interest, inventory-related contents of the first electronic accounting system also being visible, accessible, and adjustable by the computer application in real time, non-inventory-related contents of the first electronic accounting system of the first store of interest being non-accessible by the computer application;

for the second store of interest indicated by the customer in the store selection, electronically and independently connect the computer application to a second electronic accounting system of the second store of interest, the second electronic accounting system of the second store of interest being adjusted in real-time by events occurring only at the of the second store of interest, inventory-related contents of the second electronic accounting system of the second store of interest also being visible, accessible, and adjustable by the computer application in real time, non-inventory-related contents of the second electronic accounting system of the second store of interest being non-accessible by the computer application;

wherein the computer application is further configured to receive a product selection from the customer via the user interface, the product selection indicating a first item-of-interest from the first store of interest, the computer application causing actions to be performed, the actions being:

producing and rendering a virtual fitting of the first item-of-interest or the second item-of-interest on the display, wherein the virtual fitting shows the selected first item-of-interest or the selected second item-of-interest within a specific environmental context and wherein brightness levels of the selected first item-of-interest or the selected second item-of-interest are adjusted based upon the specific environmental context;

transmitting first electronic commands from the computer application to cause the robot to grasp and move an item at the first store of interest at the first retail store;

transmitting second electronic commands from the computer application to cause a camera at the robot to obtain an image of the item at the first store of interest; and transmitting an electronic message to purchase the first item-of-interest to the first retail store;

wherein the first electronic commands and the second electronic commands are processed by a second processing device at the first retail store;

wherein the processing of the first commands and second commands by the second processing device, the processing of shipments by a third processing device of the shipping system; and the processing of sales transactions by a fourth processing device of the point-of sales device occur in parallel to enhance efficiency of operation.

10. The system of claim 9, wherein the virtual fitting includes an avatar of the customer or parts of the customer and the selected item-of-interest is virtually displayed on the avatar based on sizing questions concerning body measurements answered by the customer and dimensions or characteristics of the selected item-of-interest.

11. The system of claim 10, wherein the avatar is displayed with clothing selected by the customer.

12. The system of claim 9, wherein the plurality of informational feeds include fashion feeds, art feeds, furniture feeds and/or home goods feeds.

13. The system of claim 9, wherein the AI model is trained prior to usage.

14. The system of claim 9, wherein the computer application is further configured to access databases for each potential retail store of interest selected by the customer.

15. The system of claim 9, wherein the computer application is further configured to receive customer likes and dislikes of the first item-of-interest and the second item-of-interest via the user interface.

16. The system of claim 9, wherein the computer application is configured to receive sensed information, the sensed information taken of an inventory of the customer and wherein computer application adjusts the model according to the sensed information.

\* \* \* \* \*